United States Patent
Nakasone et al.

(10) Patent No.: US 12,492,126 B2
(45) Date of Patent: Dec. 9, 2025

(54) CARBON NANOTUBE DISPERSION COMPOSITION, CARBON NANOTUBE RESIN COMPOSITION, MIXTURE SLURRY, ELECTRODE FILM, AND NON-AQUEOUS ELECTROLYTE SECONDARY BATTERY

(71) Applicants: artience Co., Ltd., Tokyo (JP); TOYOCOLOR CO., LTD., Tokyo (JP)

(72) Inventors: Daisuke Nakasone, Tokyo (JP); Kento Zushi, Tokyo (JP); Masaki Okabe, Tokyo (JP)

(73) Assignees: artience Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 0 days.

(21) Appl. No.: 18/879,797

(22) PCT Filed: Aug. 28, 2024

(86) PCT No.: PCT/JP2024/030804
§ 371 (c)(1),
(2) Date: Dec. 29, 2024

(87) PCT Pub. No.: WO2025/047825
PCT Pub. Date: Mar. 6, 2025

(65) Prior Publication Data
US 2025/0223168 A1    Jul. 10, 2025

(30) Foreign Application Priority Data
Sep. 1, 2023   (JP) .................... 2023-142593

(51) Int. Cl.
C01B 32/174     (2017.01)
B82Y 30/00      (2011.01)
C09D 5/24       (2006.01)
C09D 7/61       (2018.01)
H01M 4/13       (2010.01)
H01M 4/62       (2006.01)

(52) U.S. Cl.
CPC ............ *C01B 32/174* (2017.08); *C09D 5/24* (2013.01); *C09D 7/61* (2018.01); *H01M 4/13* (2013.01); *H01M 4/625* (2013.01); *B82Y 30/00* (2013.01); *C01B 2202/26* (2013.01); *C01B 2202/34* (2013.01); *C01B 2202/36* (2013.01); *C01P 2002/82* (2013.01); *C01P 2004/03* (2013.01); *C01P 2006/12* (2013.01); *C01P 2006/40* (2013.01); *C01P 2006/90* (2013.01)

(58) Field of Classification Search
CPC ............ C01B 32/174; C01B 2202/26; C01B 2202/34; C01B 2202/36; C09D 5/24; C09D 7/61; H01M 4/13; H01M 4/625; B82Y 30/00; C01P 2002/82; C01P 2004/03; C01P 2006/12; C01P 2006/40; C01P 2006/90
See application file for complete search history.

(56) References Cited

U.S. PATENT DOCUMENTS

| | | |
|---|---|---|
| 6,294,291 B1 | 9/2001 | Ozaki et al. |
| 2006/0035149 A1 | 2/2006 | Nanba et al. |
| 2015/0147263 A1 | 5/2015 | Noda et al. |
| 2021/0313559 A1 | 10/2021 | Zettsu et al. |
| 2022/0376262 A1 | 11/2022 | Morita et al. |
| 2023/0242402 A1 | 8/2023 | Morita et al. |
| 2023/0307642 A1* | 9/2023 | Izumiya ............... C09D 17/00 |
| 2023/0361308 A1* | 11/2023 | Hellring ............... C08F 220/14 |

FOREIGN PATENT DOCUMENTS

| | | |
|---|---|---|
| CN | 1995503 | 7/2007 |
| CN | 103015165 | 4/2013 |
| JP | H04155776 | 5/1992 |
| JP | H04237971 | 8/1992 |
| JP | 2004178922 | 6/2004 |
| JP | 2011070908 | 4/2011 |
| JP | 2012082077 | 4/2012 |
| JP | 2015188774 | 11/2015 |
| JP | 2018097961 | 6/2018 |
| JP | 6801806 | 12/2020 |
| JP | 6961152 | 11/2021 |
| WO | 2013191253 | 12/2013 |
| WO | 2022040425 | 2/2022 |
| WO | WO-2022040425 A1 * | 2/2022 ........... C01B 32/174 |
| WO | 2022102727 | 5/2022 |

(Continued)

OTHER PUBLICATIONS

"Notice of Reasons for Refusal of Japan Counterpart Application", issued on May 28, 2024, with English translation thereof, p. 1-p. 6.

(Continued)

*Primary Examiner* — Daniel S Gatewood
(74) *Attorney, Agent, or Firm* — JCIPRNET

(57) ABSTRACT

Provided is a carbon nanotube dispersion composition including carbon nanotubes, a dispersant, and a solvent and satisfying (1) and (2) as follows:

(1) an average outer diameter of the carbon nanotubes calculated from an SEM image obtained by observing the carbon nanotubes included in the carbon nanotube dispersion composition is 15 nm or more and 50 nm or less; and (2) when a target pixel group in the SEM image obtained by observing the carbon nanotubes included in the carbon nanotube dispersion composition is set as the carbon nanotubes, and a value obtained by dividing an absolute maximum length by a length of a free curve, that is, a skeleton length, is set as linearity, a proportion of carbon nanotubes with a linearity of 0.9 or more among carbon nanotubes with a skeleton length of 1 μm or more is 40% or more and 90% or less.

9 Claims, No Drawings

(56) References Cited

FOREIGN PATENT DOCUMENTS

| WO | WO-2022102727 A1 * | 5/2022 | ........... C01B 32/174 |
| WO | 2022138496 | 6/2022 | |
| WO | 2023286831 | 1/2023 | |

OTHER PUBLICATIONS

"Search Report of Europe Counterpart Application", issued on Sep. 26, 2025, pp. 1-8.

* cited by examiner

CARBON NANOTUBE DISPERSION COMPOSITION, CARBON NANOTUBE RESIN COMPOSITION, MIXTURE SLURRY, ELECTRODE FILM, AND NON-AQUEOUS ELECTROLYTE SECONDARY BATTERY

CROSS-REFERENCE TO RELATED APPLICATION

This application is a 371 application of the International PCT application serial no. PCT/JP2024/030804, filed on Aug. 28, 2024, which claims the priority benefits of Japan Patent Application No. 2023-142593, filed on Sep. 1, 2023. The entirety of each of the above-mentioned patent applications is hereby incorporated by reference herein and made a part of this specification.

TECHNICAL FIELD

The disclosure relates to a carbon nanotube dispersion composition, a carbon nanotube resin composition, a mixture slurry, an electrode film, and a non-aqueous electrolyte secondary battery.

RELATED ART

With the widespread adoption of electric vehicles and the miniaturization, weight reduction and performance enhancement of portable devices, there is a demand for secondary batteries with high energy density, and for an increased capacity of such secondary batteries. With such background, due to the properties of high energy density and high voltage, non-aqueous electrolyte secondary batteries, particularly lithium-ion secondary batteries, using non-aqueous electrolytes, are used in many devices.

As negative electrode materials of such lithium-ion secondary batteries, carbon materials represented by graphite are used. Carbon materials have a large charge-discharge capacity per unit mass at a base potential close to lithium (Li). However, in such electrode materials, the charge-discharge capacity per unit mass reaches a level close to the theoretical value, and the energy density per unit mass as a battery is approaching the limit. Therefore, from the viewpoint of increasing the utilization rate as an electrode, attempts have been made to reduce conductive additives and binders that do not contribute to discharge capacity.

As conductive additives, carbon materials such as carbon black, ketjen black, fullerene, graphene, as well as fine carbon fibers known as carbon nanotubes and carbon nanofibers are used. In particular, carbon nanotubes as a kind of fine carbon fibers are widely used. For example, by adding carbon nanotubes to negative electrodes containing graphite and silicon, the reduction of the electrode resistance, the improvement to the battery load resistance, the enhancement of the electrode intensity, and the improvement of the electrode expansion and contraction properties are achieved, thereby improving the cycle life of the lithium ion secondary batteries (see, for example, Patent Documents 1, 2, and 3). Additionally, studies are conducted on reducing electrode resistance by adding carbon nanotubes to positive electrodes (see, for example, Patent Document 4).

Patent Document 5 discloses to specify carbon nanotubes by using the pH of carbon nanotube water dispersion, the BET specific surface area, and the average fiber length, in order to obtain an electrode film with excellent conductivity and adhesion. Patent Document 6 discloses to specify a carbon nanotube dispersion liquid by using the average outer diameter of the carbon nanotubes, the BET specific surface area, the fiber length, the complex modulus, and the phase angle to obtain an electrode film with excellent conductivity and adhesion. Patent Document 7 discloses to specify by using by the average aspect ratio, the degree of curvature, the size of secondary particles of multi-layered carbon nanotubes, the size of secondary particles of inorganic oxide fine particles, and the bulk density to obtain a multi-layered carbon nanotube aggregate with good dispersibility for resins and solvents.

CITATION LIST

Patent Literature

Patent Document 1: Japanese Patent Application Laid-open No. H04-155776
Patent Document 2: Japanese Patent Application Laid-open No. H04-237971
Patent Document 3: Japanese Patent Application Laid-open No. 2004-178922
Patent Document 4: Japanese Patent Application Laid-open No. 2011-70908
Patent Document 5: Japanese Patent No. 6961152
Patent Document 6: Japanese Patent No. 6801806
Patent Document 7: Japanese Patent Application Laid-open No. 2012-082077

SUMMARY OF INVENTION

Technical Problem

Patent Documents 5 and 6 disclose providing a non-aqueous electrolyte secondary battery with excellent rate properties and cycle properties by obtaining an electrode film with superior conductivity and adhesion. Meanwhile, it is expected that battery performance can be further improved by specifying a more microscopic dispersion state of carbon nanotubes in the electrode film.

According to the technology disclosed in Patent Document 7, by bending multi-layered carbon nanotubes to a certain degree, aggregation is prevented when the carbon nanotubes are added to resins, etc. Therefore, a bent shape is preferable over those in which the multi-layered carbon nanotubes have high linearity. Meanwhile, to secure a conductive path between multiple particles of the active substance in the electrode film and improve battery performance, further consideration from a different perspective is also expected.

The disclosure has as one of its objectives to provide a carbon nanotube dispersion composition, a carbon nanotube resin composition, and a mixture slurry that can improve battery performance, as well as an electrode film and a non-aqueous electrolyte secondary battery obtained by using the same.

Solution to Problem

The embodiments of the disclosure relate to the following. However, the invention is not limited to the following, and may include various embodiments.

[1] A carbon nanotube dispersion composition, includes: carbon nanotubes; a dispersant; and a solvent, wherein the carbon nanotube dispersion composition satisfies (1) and (2) as follows:

(1) an average outer diameter of the carbon nanotubes calculated from an SEM image obtained by observing the carbon nanotubes included in the carbon nanotube dispersion composition is 15 nm or more and 50 nm or less; and (2) when a target pixel group in the SEM image obtained by observing the carbon nanotubes included in the carbon nanotube dispersion composition is set as the carbon nanotubes, and a value obtained by dividing a distance between two points that are farthest apart, that is, an absolute maximum length, by a length of a free curve, that is, a skeleton length, is set as linearity, a proportion of carbon nanotubes with a linearity of 0.9 or more among carbon nanotubes with a skeleton length of 1 μm or more is 40% or more and 90% or less.

In the carbon nanotube dispersion composition according to [1]. (3) in a Raman spectrum of a coating film of the carbon nanotube dispersion composition, when a maximum peak intensity within a range of 1560 $cm^{-1}$ to 1600 $cm^{-1}$ is set as G and a maximum peak intensity within a range of 1310 $cm^{-1}$ to 1350 $cm^{-1}$ is set as D, a G/D ratio is 1.0 to 20.0.

[3] In the carbon nanotube dispersion composition according to [1] or [2], (4) after the carbon nanotube dispersion composition is frozen and dried, a BET specific surface area of a powder that passes through a 60-μm mesh with respect to a mass of carbon nanotubes is 50 $m^2/g$ to 130 $m^2/g$.

[4] In the carbon nanotube dispersion composition according to any one of [1] to [3], (5) a complex modulus is 4 Pa or more and 200 Pa or less at 25° C. and a frequency of 10 Hz according to dynamic viscoelasticity measurement.

[5] In the carbon nanotube dispersion composition according to any one of [1] to [4], (6) a phase angle at 25° C. and a frequency of 10 Hz according to dynamic viscoelasticity measurement is 3° or more and 60° or less.

[6] A carbon nanotube resin composition includes: the carbon nanotube dispersion composition according to any one of [1] to [5]; and a binder.

[7] A mixture slurry includes the carbon nanotube dispersion composition according to any one of [1] to [5]; a binder; and an active substance.

[8] An electrode film as a coating film of a mixture slurry is provided. The mixture slurry includes: the carbon nanotube dispersion composition according to any one of [1] to [5], a binder, and an active substance.

[9] A non-aqueous electrolyte secondary battery as a non-aqueous electrolyte secondary battery includes a positive electrode, a negative electrode, and an electrolyte, wherein at least one of the positive electrode and the negative electrode includes the electrode film according to [8].

Effects of Invention

According to an embodiment of the disclosure, a carbon nanotube dispersion composition, a carbon nanotube resin composition, and a mixture slurry that can improve battery performance, as well as an electrode film and a non-aqueous electrolyte secondary battery obtained by using the same can be provided.

DESCRIPTION OF EMBODIMENTS

In the following, several embodiments of the disclosure will be used to describe in detail a carbon nanotube dispersion composition, as well as a resin composition, a mixture slurry, an electrode film, and a non-aqueous electrolyte secondary battery including the same. However, the disclosure is not limited to the embodiments, and various modifications are possible.

In the disclosure, carbon nanotubes may be abbreviated as "CNT", and carbon nanotube dispersion composition may be abbreviated as "CNT dispersion composition". Additionally, in the disclosure, an SEM image refers to an image captured by a scan-type electron microscope. The scan-type electron microscope may also be simply referred to as "SEM".

The inventors of the invention have found that with the average outer diameter and the linearity index of the carbon nanotubes satisfying a predetermined range in a state where the carbon nanotubes are included in a carbon nanotube dispersion composition, a single (i.e., individual) carbon nanotube contacts multiple particles of the active substance (at a higher rate) in the electrode film, and the conductivity between the particles of the active substance are improved, thereby providing a secondary battery with excellent rate properties and cycle properties. Based on these findings, the inventors have completed the invention.

As an electrode material, whether for the negative electrode or the positive electrode, the conductivity can be enhanced by electrically connecting multiple particles of the active substance with a single carbon nanotube. In the case where the carbon nanotubes possess linearity, it is possible for a single carbon nanotube to contact a greater number of particles of the active substance, thereby contributing to conductivity. Accordingly, it is expected that a small amount of carbon nanotubes can make significant contribution to conductivity.

For example, although the electrode film can increase the filling density of the active substance by reducing the volume of the dispersant, the binders, etc., by further reducing the usage amount and the volume of the carbon nanotubes, the filling density of the active substance can be further increased.

In the case of using a carbon-based active substance is used for the negative electrode, the conductivity can be enhanced by electrically connecting multiple particles of the carbon-based active substance with a single carbon nanotube. However, in the case where a silicon-based active substance is used for the negative electrode, there is a tendency that the volume changes easily due to charging and discharging. If volume changes occur in the negative electrode, the electrical connection between the particles of the active substance is cut off, and some of the particles of the active substance become electrically isolated. Carbon nanotubes with linearity can relatively easily maintain contact with multiple particles of the active substance even if volume changes occur in the particles of the active substance, the conductive path can be prevented from being cut off, and the decrease in battery capacity can be suppressed.

Similarly, for the positive electrode, since a single carbon nanotube can electrically connect multiple particles of the active substance and secure a conductive path, even with a small amount of carbon nanotubes, a significant contribution to conductivity can be expected.

<Carbon Nanotube Dispersion Composition>

An embodiment relates to a carbon nanotube dispersion composition. The carbon nanotube dispersion composition includes at least carbon nanotubes, a dispersant, and a solvent.

The carbon nanotube dispersion composition satisfies (1) and (2) as follows.

(1) The average outer diameter of the carbon nanotubes calculated from an SEM image obtained by observing carbon nanotubes included in the carbon nanotube dispersion composition is 15 nm or more and 50 nm or less.

(2) When a target pixel group in the SEM image obtained by observing the carbon nanotubes included in the carbon nanotube dispersion composition is considered as carbon nanotubes (in other words, based on the pixelated carbon nanotubes in the SEM image obtained by observing the carbon nanotubes included in the carbon nanotube dispersion composition, or alternatively, the pixel group corresponding to the carbon nanotubes is used as a proxy), and the linearity is defined as a value obtained by dividing the distance between the two points farthest apart (absolute maximum length) by the length of a free curve (skeleton length), the proportion of carbon nanotubes with a linearity of 0.9 or more among those with a skeleton length of 1 μm or more is 40% or more and 90% or less.

Hereinafter, the index specified in (2) is also referred to as the linearity index.

With the average outer diameter of the carbon nanotubes satisfying a predetermined range and the linearity index being specified in the state in which the carbon nanotubes are included in the carbon nanotube dispersion composition, it is possible to provide excellent battery performance in a secondary battery using the carbon nanotube dispersion composition.

While not bound by theories, the reason is considered as that by satisfying Conditions (1) and (2), the linearity of the carbon nanotubes is maintained in the electrode film, allowing individual carbon nanotubes to contact multiple particles of the active substance at a higher rate, and improving conductivity. The number of particles of the active substance in contact with a single carbon nanotube should be 2 or more, and preferably 3 or more. It may also be that not all carbon nanotubes contact multiple particles of the active substance, and it suffices if only some of the carbon nanotubes contact multiple particles of the active substance.

In Condition (1), the average outer diameter of the carbon nanotubes is preferably 15 nm or more, more preferably more than 17 nm, even more preferably 19 nm or more, and still more preferably 21 nm or more. In such ranges, the carbon nanotubes possess resistance against stress from being bent and can maintain a conductive path that runs through active substances whose volumes change due to absorption and release of lithium ions. Additionally, carbon nanotubes with an average outer diameter less than 15 nm are difficult to obtain to exhibit physical properties within the appropriate range of the disclosure due to the manufacturing method thereof. For example, in the carbon nanotube dispersion composition, it is difficult to synthesize and obtain carbon nanotube raw materials in which the average outer diameter is less than 15 nm and which can possess the linearity index of Condition (2). Furthermore, when using a carbon nanotube raw material with an average outer diameter of 15 nm or more, a manufacturing method for a carbon nanotube dispersion composition that possesses the linearity index of Condition (2) is not known previously.

In Condition (1), the average outer diameter of the carbon nanotubes is preferably 50 nm or less, more preferably 40 nm or less, and even more preferably 30 nm or less. Within such ranges, it is possible to increase the number of fibers per unit mass of carbon nanotubes, thereby increasing the number of the active substances to which the carbon nanotubes are distributed and further improving battery performance. Additionally, when the average outer diameter of the carbon nanotubes is 50 nm or less, the carbon nanotubes themselves become low-resistance, and further enhance conductivity. This allows for improved rate properties in the secondary battery. Furthermore, since the carbon nanotubes in the embodiment possess linearity, the carbon nanotubes can maintain high conductivity while contacting multiple particles of the active substance in the electrode film, thereby securing the conductive path and contributing to improved conductivity. For example, the average outer diameter of the carbon nanotubes may be 15 nm to 50 nm, 15 nm to 40 nm, or 15 nm to 30 nm. The average outer diameter may also be 17 nm to 40 nm, 19 nm to 30 nm, or 21 nm to 30 nm.

In Condition (2), the linearity index of the carbon nanotubes is preferably 40% or more, more preferably 50% or more, and even more preferably 60% or more. A carbon nanotube group with a high linearity index can contact multiple particles of the active substance at a higher rate in the electrode film, and contribution can be made to high conductivity in the secondary battery.

In Condition (2), the linearity index of the carbon nanotubes is preferably 90% or less, more preferably 80% or less, and even more preferably 70% or less. As the linearity index of the carbon nanotubes increases, the carbon nanotubes themselves tend to become harder, and there is a possibility that the fibers of the carbon nanotubes may break during the dispersion process when the electrode film is provided from the carbon nanotube dispersion composition. In this case, the number of particles of the active substance that a single carbon nanotube can contact in the electrode film may be reduced, potentially resulting in insufficient conductivity in the secondary battery. For example, the linearity index of the carbon nanotubes may be 40% to 90%, 50% to 90%, 60% to 90%, or the linearity index may be 50% to 80%, 50% to 70%, or 60% to 70%.

In the disclosure, with the measurement method for the average outer diameter of the carbon nanotubes in the carbon nanotube dispersion composition, values are measured according to the following procedure.

A sample with which individual carbon nanotubes can be observed by using SEM is prepared by using the carbon nanotube dispersion composition. From the SEM image of the sample, 300 arbitrary carbon nanotubes are selected, and the number average of the average outer diameter is determined. Specifically, the following procedure is adopted.

Sample preparation: The CNT dispersion composition is diluted with a solvent to achieve a CNT concentration of 0.048 mass %. The solvent used at the time of preparing the CNT dispersion composition is used as the solvent. After spray-coating several microliters of the diluted dispersion composition onto a mica substrate, it is dried on a hot plate at 100° C. to prepare a substrate for observing the average outer diameter of CNTs.

Measurement method: The carbon nanotubes are observed and imaged by using a scan-type electron microscope. Next, 300 arbitrary carbon nanotubes are selected from the observed image, and the respective outer diameters are measured. Then, the average outer diameter (nm) of the carbon nanotubes is calculated as the number average of the outer diameters. Specifically, the measurement method for the average outer diameter follows the measurement method described in the examples.

In the disclosure, with the measurement method for the linearity index of the carbon nanotubes in the carbon nanotube dispersion composition, values are measured according to the following procedure.

A sample with which individual carbon nanotubes can be observed by using SEM is prepared by using the carbon nanotube dispersion composition. From the SEM image of the sample, a total of 1000 to 3000 carbon nanotubes are selected, and the absolute maximum length and the skeleton length of each carbon nanotube are measured. The number of carbon nanotubes with a skeleton length of 1 µm or more is counted, and the linearity and the linearity index are calculated. Specifically, the following procedure is adopted.

Sample preparation: The CNT dispersion composition is diluted with a solvent to achieve a CNT concentration of 0.048 mass %. The solvent used at the time of preparing the CNT dispersion composition is used as the solvent. After spray-coating several microliters of the diluted dispersion composition onto a mica substrate, it is dried on a hot plate at 100° C. to prepare a substrate for observing the linearity index of CNTs.

Measurement method: SEM images of the sample substrate are obtained. At this time, it is set so that the shapes of 50 to 200 carbon nanotubes can be observed in one field of view. The SEM images are captured under the condition of 4.63 nm per pixel. An error range of 4.63 nm±10% is acceptable for the imaging condition. The SEM images are obtained by moving the field of view until a total of 1000 to 3000 carbon nanotubes can be observed.

Software: The SEM images are analyzed by using image analysis software such as "WinROOF2015" (manufactured by Mitani Corporation) to calculate the absolute maximum length and the skeleton length for each carbon nanotube. The linearity is calculated by using the following equation: Linearity=Absolute maximum length/Skeleton length The absolute maximum length is the distance between two points that are farthest apart in the target pixel group (i.e., the pixel group derived from such single carbon nanotube). The skeleton length is the length of the free curve formed by the target pixel group Next, for each field of view in the SEM image, a number a of carbon nanotubes with a skeleton length of 1 µm or more is calculated, and a number b of carbon nanotubes with a skeleton length of 1 µm or more and a linearity of 0.9 or more is calculated. The linearity index is then calculated as follows:

$$\text{Linearity index } (\%) = (b/a) \times 100$$

Specifically, the measurement method for the linearity index follows the measurement method described in the examples.

The carbon nanotube dispersion composition preferably satisfies (3) as follows.

(3) In a Raman spectrum of the coating film of the carbon nanotube dispersion composition, when the maximum peak intensity within the range of 1560 $cm^{-1}$ to 1600 $cm^{-1}$ is denoted as G, and the maximum peak intensity within the range of 1310 $cm^{-1}$ to 1350 $cm^{-1}$ is denoted as D, the G/D ratio is 1.0 to 20.0.

The G/D ratio of the coating film of the carbon nanotube dispersion composition is preferably 1.0 or more, more preferably 1.1 or more, even more preferably 1.3 or more, and still more preferably 1.7 or more. A high G/D ratio indicates high crystallinity of the carbon nanotubes. Carbon nanotubes with high crystallinity have the advantage of contributing to the conductivity in secondary batteries. Carbon nanotubes with high crystallinity are more likely to maintain the linearity index in the carbon nanotube dispersion composition, further enhance linearity and allow for more sufficient achievement of the effects described above.

The G/D ratio of the coating film of the carbon nanotube dispersion composition is preferably 20 or less, more preferably 10 or less, even more preferably 8.0 or less, and may be 7.0 or less, 5.0 or less, or 2.0 or less. When the G/D ratio of the coating film of the carbon nanotube dispersion composition is within the range, there is a tendency for the contact area of a single carbon nanotube per particle of the active substance in the electrode film to increase, and the conductivity of the secondary battery can be further increased. Additionally, as the crystallinity of the carbon nanotubes increases, the carbon nanotubes themselves become harder, making it difficult to maintain the linearity index in the carbon nanotube dispersion composition due to shortening of the fiber length caused by breakage of the carbon nanotubes. Moreover, preventing the breakage of carbon nanotubes may complicate the management of the dispersion process. From the perspective of carbon nanotubes being provided with appropriate flexibility, it is particularly preferable for the G/D ratio of the coating film of the carbon nanotube dispersion composition to be 8.0 or less. For example, the G/D ratio of the coating film of the carbon nanotube dispersion composition may be 1.0 or more and 20 or less, 1.1 or more and 10 or less, or 1.3 or more and 8.0 or less, or alternatively, the G/D ratio may be 1.0 or more and 7.0 or less, 1.0 or more and 5.0 or less, or 1.0 or more and 2.0 or less.

In the disclosure, the G/D ratio of the coating film of the carbon nanotube dispersion composition is a value measured according to the following procedure.

First, the carbon nanotube dispersion composition is coated on a substrate and dried to obtain a coating film. Drying can be performed at a temperature to an extent of removing volatile components, and can be adjusted appropriately depending on the type of the solvent. The temperature may be, for example, 100° C. to 200° C. The thickness of the coating film should be sufficient to allow the Raman spectrum to perform measurement, and may be, for example, 1 µm to 10 µm. The Raman spectrum of the obtained coating film is measured, and the G/D ratio is calculated. Specifically, the method for measuring the G/D ratio of the coating film of the carbon nanotube dispersion composition follows the measurement method described in the examples.

The carbon nanotube dispersion composition preferably satisfies (4) as follows.

(4) The BET specific surface area with respect to the carbon nanotube mass of the powder that passes through a 60-µm mesh after freeze-drying the carbon nanotube dispersion composition is 50 $m^2/g$ to 130 $m^2/g$.

The BET specific surface area with respect to the carbon nanotube mass of the carbon nanotube powder derived from the carbon nanotube dispersion composition is preferably 50 $m^2/g$ or more, more preferably 60 $m^2/g$ or more, and even more preferably 65 $m^2/g$ or more. In such ranges, it is predicted that the carbon nanotubes in the carbon nanotube dispersion composition have a smaller average outer diameter and higher conductivity, and battery performance may be further improved. Additionally, it is predicted that the fiber length of carbon nanotubes per unit volume is longer and the linearity is higher, and battery performance is improved with a smaller amount of carbon nanotubes in the electrode film.

The BET specific surface area with respect to the carbon nanotube mass of the carbon nanotube powder derived from the carbon nanotube dispersion composition is preferably 130 $m^2/g$ or less, more preferably 125 $m^2/g$ or less, and even more preferably 120 $m^2/g$ or less. In such ranges, in the carbon nanotube dispersion composition, the aggregation of carbon nanotubes is suppressed, thereby maintaining the linearity of carbon nanotubes in the electrode film and further improving battery performance. Additionally, even if the number of carbon nanotubes per unit volume is reduced, since the carbon nanotubes possess linearity, a single carbon nanotube in the electrode film can contact multiple particles of active substance, the conductive path is maintained, and contribution can be made to battery performance.

With the BET specific surface area of the carbon nanotube powder with respect to the carbon nanotube mass falling within the ranges, the workability of dispersing the carbon nanotube raw material in the solvent improves, and a carbon nanotube dispersion composition with good dispersibility can be obtained. By using a carbon nanotube dispersion composition with good dispersibility, the distribution of carbon nanotubes in the electrode film becomes more uniform, allowing a single carbon nanotube to contact multiple particles of the active substance, ensuring conductive paths, and contributing to battery performance improvement.

For example, the BET specific surface area of the carbon nanotube powder derived from the carbon nanotube dispersion composition with respect to the carbon nanotube mass may be 50 $m^2/g$ or more and 130 $m^2/g$ or less, 60 $m^2/g$ or more and 125 $m^2/g$ or less, or 65 $m^2/g$ or more and 120 $m^2/g$ or less. Such ranges are preferable because the ranges do not cause a decrease in battery performance due to excessive aggregation or over-dispersion.

In the disclosure, the BET specific surface area of the carbon nanotube powder derived from the carbon nanotube dispersion composition is a value measured according to the following procedure.

100 mL of the carbon nanotube dispersion composition is frozen and dried for 5 hours in a −95° C. ethanol bath using a freeze dryer (for example, FDU-1200/UT-4000 manufactured by EYELA), then dried under a reduced pressure at 10 Pa to 30 Pa for 20 hours to obtain carbon nanotube powder. The BET specific surface area of the obtained carbon nanotube powder is measured after the carbon nanotube powder passes through a 60-μm mesh. Specifically, the BET specific surface area of the carbon nanotube powder derived from the carbon nanotube dispersion composition follows the measurement method described in the examples.

<Carbon Nanotubes>

The carbon nanotubes, in the state of being included in the carbon nanotube dispersion composition, may be defined by the following properties. The carbon nanotubes have a shape in which planar graphite is rolled into a cylindrical form. Carbon nanotubes may be either single-layered carbon nanotubes or multi-layered carbon nanotubes. Single-layered carbon nanotubes have a structure in which a single layer of graphite is rolled. Multi-layered carbon nanotubes have a structure in which two or more layers of graphite are rolled. Additionally, the sidewalls of the carbon nanotubes do not necessarily need to have a graphite structure. For example, carbon nanotubes with sidewalls having an amorphous structure can also be used as carbon nanotubes. From the perspective of being suitable for industrial mass production, it is preferable to use multi-layered carbon nanotubes. In addition, multi-layered carbon nanotubes are preferred from the viewpoint of dispersing to satisfy the desired range of the average outer diameter and the linearity index. In the case of using multi-layered carbon nanotubes, single-layered carbon nanotubes may be mixed with the carbon nanotubes.

For multi-layered carbon nanotubes, it is preferable that the number of layers of the carbon nanotubes is 3 or more and 30 or less, more preferable that the number of layers is 3 or more and 20 or less, and even more preferable that the number of layers is 3 or more and 10 or less.

The shape of the carbon nanotubes is not particularly limited as long as the average outer diameter and the linearity index satisfy the desired range. Such shapes may include, for example, various shapes such as a needle-like shape, a cylindrical tube-like shape, a fishbone-like (fishbone or cup-stacked type) shape, and a coil-like shape. Among these, from the viewpoint of linearity, it is preferable that the shape of the carbon nanotubes is needle-like or cylindrical tube-like. The carbon nanotubes may be of a single shape or a combination of two or more shapes. In the case where highly flexible carbon nanotubes such as fishbone-like and coil-like carbon nanotubes are included, it is sufficient if the carbon nanotubes included in the carbon nanotube dispersion composition satisfy the average outer diameter and the linearity index as a whole.

The forms of carbon nanotubes include, for example, graphite whiskers, filamentous carbon, graphite fibers, ultrafine carbon tubes, carbon tubes, carbon fibrils, carbon microtubes, and carbon nanofibers. However, the invention is not limited thereto. Carbon nanotubes may exhibit a single form or a combination of two or more forms of the above.

In the state where the carbon nanotubes are included in the carbon nanotube dispersion composition, the average fiber length of the carbon nanotubes is preferably 1 μm to 5 μm, and more preferably 1 μm to 3.5 μm. To measure the fiber length of the carbon nanotubes, the CNT dispersion composition is diluted with a solvent so that the CNT concentration becomes 0.048 mass %, then several μL of the diluted dispersion composition is spray-coated onto a mica substrate and dried on a hot plate at 100° C. to prepare a substrate for observing CNT fiber length. The solvent used at the time of preparing the CNT dispersion composition is used as the solvent.

The SEM image is analyzed by using image analysis software such as "WinROOF2015" (manufactured by Mitani Corporation), and the skeletal length of a single carbon nanotube is calculated as the fiber length. The average fiber length is determined by counting the fiber lengths of 1000 to 3000 carbon nanotubes and calculating the average as the average fiber length.

In the state where the carbon nanotubes are included in the carbon nanotube dispersion composition, the maximum fiber length of the carbon nanotubes is preferably 20 μm or less, and is more preferably 10 μm or less. The maximum fiber length of the carbon nanotubes can be measured by an image analysis using a method similar to that used for evaluating the average fiber length.

<Carbon Nanotube Raw Material>

The carbon nanotube dispersion composition can be obtained by using the carbon nanotube raw material. In the following, several examples of carbon nanotube raw materials that can be used in the manufacturing method of the carbon nanotube dispersion composition are described. The carbon nanotube dispersion composition according to the embodiment can exhibit effects by using carbon nanotubes from various sources. In the following description, the carbon nanotube raw material refers to carbon nanotubes in the raw material state before being added to the carbon nanotube dispersion composition.

The average outer diameter of the carbon nanotube raw material is preferably 50 nm or less, more preferably 40 nm or less, or even more preferably 20 nm or less. In such ranges, the amount of the dispersant can be reduced for the carbon nanotube raw material, and the filling density of the active substance in the electrode film can be further increased. For example, the average outer diameter of the carbon nanotube raw material may be 1 nm to 50 nm, 5 nm to 40 nm, or 7 nm to 20 nm. By using the carbon nanotube raw material in such ranges, a carbon nanotube dispersion composition with a more suitable range of average outer diameter and linearity index can be obtained.

The standard deviation of the outer diameter of the carbon nanotube raw material is preferably 1 nm to 5 nm, and more preferably 1 nm to 4 nm.

The measurement of the average outer diameter of the carbon nanotube raw material is performed as follows. First, carbon nanotubes are observed and imaged by using a scan-type electron microscope. Next, 300 arbitrary carbon nanotubes are selected from the observed image, and the respective outer diameters are measured. Then, the average outer diameter (nm) of the carbon nanotube raw material is calculated as the numerical average of the outer diameters.

The linearity index of the carbon nanotube raw material may be 40% to 90%, 50% to 90%, 60% to 90%, or the linearity index may be 50% to 80% or 60% to 70%. By using the carbon nanotube raw material in such range, a carbon nanotube dispersion composition including carbon nanotubes with a more suitable range of average outer diameter and linearity index can be obtained.

The linearity index of the carbon nanotube raw material is a value as described above, which is obtained according to the same procedure as for the sample taken from the carbon nanotube dispersion composition.

In the Raman spectrum of the carbon nanotube raw material, when the maximum peak intensity in the range of 1560 cm$^{-1}$ to 1600 cm$^{-1}$ is denoted as G, and the maximum peak intensity in the range of 1310 cm$^{-1}$ to 1350 cm$^{-1}$ is denoted as D, the G/D ratio may be 0.8 to 100, 1.1 to 10, or 1.7 to 7. By using the carbon nanotube raw material in such ranges, a carbon nanotube dispersion composition including carbon nanotubes with a more suitable range of G/D ratio can be obtained.

The G/D ratio of the carbon nanotube raw material is a value obtained by using the same procedure as the procedure for the coating film of the carbon nanotube dispersion composition described above.

The BET specific surface area of the carbon nanotube raw material may be 100 m$^2$/g to 1000 m$^2$/g. 150 m$^2$/g to 800 m$^2$/g, or 200 m$^2$/g to 500 m$^2$/g. By using the carbon nanotube raw material in such ranges, a carbon nanotube dispersion composition including carbon nanotubes with a more suitable range of the BET specific surface area can be obtained. The BET specific surface area of the carbon nanotube raw material is preferably 1000 m$^2$/g or less, 800 m$^2$/g or less, or 500 m$^2$/g or less, and may be 100 m$^2$/g or more, 120 m$^2$/g or more, or 150 m$^2$/g or more. In such ranges, the dispersion process can be simplified when dispersing the carbon nanotube raw material in a solvent. In addition, the dispersibility can be obtained in a smaller amount of the dispersant, so a higher filling density of the active substance in the electrode film can be obtained.

The BET specific surface area of the carbon nanotube raw material is a value obtained by using the same procedure as the carbon nanotube powder derived from the carbon nanotube dispersion composition described above.

For the carbon nanotube raw material, a single type may be used, or a combination of two or more types may be used. In the case of using two or more types of the carbon nanotube raw material, at least a portion of the two or more types of the carbon nanotube raw material exhibit the BET specific surface area within the predetermined range mentioned above. However, it is even more preferable if all of the two or more types of carbon nanotube raw materials exhibit the BET specific surface area within the predetermined range. Furthermore, in the case of using a mixed powder of the entirety of the two or more types of carbon nanotube raw materials, the mixed powder may also exhibit the BET specific surface area within the predetermined range.

The average fiber length of the carbon nanotube raw material is preferably 1 to 5 μm, and more preferably 1 to 3.5 μm. The fiber length of the carbon nanotube raw material can be measured by dispersing the carbon nanotube raw material in toluene by using an ultrasonic homogenizer, then performing SEM observation on the carbon nanotubes deposited on a mica substrate, and analyzing the image. The SEM image is analyzed by using image analysis software such as "WinROOF2015" (manufactured by Mitani Corporation), and the skeletal length of a single carbon nanotube is calculated as the fiber length. The average fiber length is determined by counting the fiber lengths of 1000 to 3000 carbon nanotubes and calculating the average as the average fiber length.

The maximum fiber length of the carbon nanotube raw material is preferably 20 μm or less, and more preferably 10 μm or less. The maximum fiber length of the carbon nanotube raw material can be measured by dispersing the carbon nanotube raw material in toluene by using an ultrasonic homogenizer, performing SEM observation on the carbon nanotubes deposited on a mica substrate, and analyzing the image.

The volume resistivity of the carbon nanotube raw material is preferably $1.0 \times 10^{-2}$ Ω·cm to $3.0 \times 10^{-2}$ Ω·cm, and more preferably 1.0 Ω·cm×10$^{-2}$ to 2.0 Ω·cm×10$^{-2}$. The volume resistivity of the carbon nanotubes can be measured by using a powder resistivity measurement device (for example, Lorester GP powder resistivity measurement system "MCP-PD-51" manufactured by Mitsubishi Chemical Analytech Co., Ltd.). It is preferable if the volume resistivity of the carbon nanotubes in the state included in the carbon nanotube dispersion composition satisfies the above range, like the carbon nanotube raw material.

The carbon purity of the carbon nanotube raw material is expressed as the content ratio (%) of carbon atoms in the carbon nanotube raw material. The carbon purity is preferably 90 mass % or more, more preferably 95 mass % or more, and even more preferably 98 mass % or more, with respect to 100 mass % of the carbon nanotube raw material. It is even more preferable if the carbon purity of the carbon nanotubes in the state included in the carbon nanotube dispersion composition satisfies the range similarly to the carbon nanotube raw material.

The metal content included the carbon nanotube raw material is preferably less than 10 mass %, more preferably less than 5 mass %, even more preferably less than 2 mass %, and most preferably less than 1 mass %, with respect to 100 mass % of the carbon nanotube raw material. As the metal included in the carbon nanotube raw material, examples may include metals or metal oxides used as a catalyst in the synthesis of the carbon nanotube raw material. Specifically, examples may include at least one metal selected from the group consisting of cobalt, nickel, aluminum, magnesium, silica, manganese, and molybdenum, metal oxides thereof, and composite oxides thereof. It is even more preferable if the metal content of the carbon nanotubes in the state included in the carbon nanotube dispersion composition satisfies the above range similarly to the carbon nanotube raw material.

Carbon nanotubes normally exist as secondary particles. In the carbon nanotube raw material, the shape of the carbon nanotube secondary particles can be, for example, in a state where general primary particle carbon nanotubes are intricately entangled, or as an aggregate where carbon nanotubes are arranged along a straight line.

In the state included in the carbon nanotube dispersion composition, the shape of the carbon nanotube secondary particles may maintain the shape of the carbon nanotube raw material. For example, in the state of being included in the carbon nanotube dispersion composition, by arranging the shape of the carbon nanotube secondary particles as an aggregate arranged alone a straight line, the average outer diameter and the linearity index of the carbon nanotubes can be more appropriately controlled within a predetermined range.

The carbon nanotube raw material may also be carbon nanotubes having received a surface treatment. The carbon nanotube raw material may also be a carbon nanotube derivative with a functional group, such as a carboxyl group, attached. Additionally, the carbon nanotube raw material may be carbon nanotubes encapsulating substances represented by organic compounds, metal atoms, or fullerenes.

The carbon nanotube raw material can be carbon nanotubes manufactured by any method. The carbon nanotube raw material can generally be manufactured by laser ablation, arc discharge, thermal CVD, plasma CVD method, and combustion method. However, the invention is not limited thereto. For example, the carbon nanotube raw material can be manufactured by reacting a carbon source with a catalyst at 500° C. to 1000° C. in an atmosphere with an oxygen concentration of 1 volume % or less. The carbon source may be at least one of hydrocarbons and alcohols.

Any conventionally known arbitrary material can be used as the raw gas serving as the carbon source of the carbon nanotube raw material. For example, as the raw gas containing carbon, hydrocarbons represented by methane, ethylene, propane, butane, and acetylene, carbon monoxide, and alcohols can be used. However, the invention is not limited thereto. In particular, from the viewpoint of ease of use, it is desirable to use at least one of hydrocarbons and alcohols as the raw gas.

Depending on the manufacturing method of the carbon nanotube raw material, as the heat treatment temperature increases, the crystallinity of the carbon nanotubes tends to increase, and the carbon nanotubes tend to become harder. To appropriately control the hardness of the carbon nanotubes and to prevent the carbon nanotubes from breaking during the dispersion process in the manufacturing of the carbon nanotube dispersion composition, the heat treatment temperature in the manufacturing of carbon nanotubes should be relatively low, for example, it may be 1000° C. or less.

Although a certain fiber length is required to obtain the linearity of carbon nanotubes, if the crystallinity of carbon nanotubes is further enhanced by performing a high-temperature heat treatment, the tendency for carbon nanotubes to break increases. From this perspective as well, the temperature of the heat treatment in the manufacturing of carbon nanotubes should be relatively low. In this case, the obtained carbon nanotube raw material may include either single-layered carbon nanotubes or multi-layered carbon nanotubes alone, or a combination of both. From the viewpoint of controlling crystallinity and fiber length of carbon nanotubes, manufacturing multi-layered carbon nanotubes is more straightforward and has industrial advantages.

(Dispersant)

The dispersant can be used without particular limitation as long as it can stably disperse carbon nanotubes. For example, at least one of a surfactant and a resin-type dispersant can be used. The types of the surfactants are mainly classified into anionic, cationic, nonionic, and amphoteric types. Depending on the properties required for dispersing carbon nanotubes, an appropriate type of the dispersant can be used in a suitable formulation amount. In an embodiment, it is preferable to use a resin-type dispersant.

In the case where an anionic surfactant is selected, the type thereof is not particularly limited. Specifically, examples may include fatty acid salts, polysulfonic acid salts, polycarboxylic acid salts, alkyl sulfate ester salts, alkylarylsulfonic acid salts, alkylnaphthalenesulfonic acid salts, dialkylsulfonic acid salts, dialkylsulfosuccinic acid salts, alkyl phosphate salts, polyoxyethylene alkyl ether sulfate salts, polyoxyethylene alkylaryl ether sulfate salts, naphthalene sulfonic acid formalin condensates, polyoxyethylene alkyl phosphate sulfonic acid salts, glycerol borate fatty acid esters, and polyoxyethylene glycerol fatty acid esters. However, the invention is not limited thereto. Furthermore, specifically, examples may include sodium dodecylbenzenesulfonate, sodium lauryl sulfate, sodium polyoxyethylene lauryl ether sulfate, polyoxyethylene nonylphenyl ether sulfate ester salt, and sodium salt of β-naphthalene sulfonic acid formalin condensate. However, the invention is not limited thereto.

As for cationic surfactants, examples may include alkylamine salts and quaternary ammonium salts. Specifically, examples may include stearylamine acetate, trimethyl coconut ammonium chloride, trimethyl allow ammonium chloride, dimethyl dioleyl ammonium chloride, methyl oleyl diethanol chloride, tetramethylammonium chloride, lauryl pyridinium chloride, lauryl pyridinium bromide, lauryl pyridinium disulfate, cetyl pyridinium bromide, 4-alkylmercaptopyridine, poly(vinylpyridine)-dodecyl bromide, and dodecylbenzyltriethylammonium chloride. However, the invention is not limited thereto.

As for amphoteric surfactants, examples may include amino carboxylic acid salts. However, the invention is not limited to these.

As for nonionic surfactants, examples may include polyoxyethylene alkyl ethers, polyoxyalkylene derivatives, polyoxyethylene phenyl ethers, sorbitan fatty acid esters, polyoxyethylene sorbitan fatty acid esters, and alkyl aryl ethers. However, the invention is not limited thereto. Specifically, examples may include polyoxyethylene lauryl ether, sorbitan fatty acid esters, and polyoxyethylene octylphenyl ether. However, the invention is not limited thereto.

The selected surfactant is not limited to a single surfactant. It is possible to use a combination of two or more surfactants. For example, a combination of an anionic surfactant and a nonionic surfactant, or a combination of a cationic surfactant and a nonionic surfactant can be used. In such cases, it is preferable that the mixture amount for each surfactant component is set to an appropriate mixture amount. As a combination, a combination of an anionic surfactant and a nonionic surfactant is preferable. It is preferable that the anionic surfactant includes a polycarboxylic acid salt. It is preferable that the nonionic surfactant includes a polyoxyethylene phenyl ether.

As for specific resin-type dispersants, examples may include cellulose derivatives (cellulose acetate, cellulose acetate butyrate, cellulose butyrate, cyanoethyl cellulose, ethyl hydroxyethyl cellulose, nitrocellulose, methyl cellulose, ethyl cellulose, hydroxyethyl cellulose, hydroxypropyl cellulose, hydroxypropyl methyl cellulose, carboxymethyl cellulose, etc., or salts thereof), polyvinyl alcohol, polyvinyl butyral, polyvinyl pyrrolidone, polyacrylonitrile, polyacrylonitrile-based polymers (copolymers of polyacrylonitrile and acrylic acid, etc.), poly(meth)acrylic acid or salts thereof, poly(meth)acrylates, nitrile rubbers (acrylonitrile butadiene rubber, hydrogenated acrylonitrile butadiene rubber, copolymers of hydrogenated nitrile rubber and hydrogenated butadiene acrylonitrile, etc.) Polymers in which other substituents are introduced into a part of the polymers, or modified polymers may also be used. Particularly preferable are methyl cellulose, ethyl cellulose, carboxymethyl cellulose, or salts thereof, polyvinyl alcohol, polyvinyl butyral, polyvinyl pyrrolidone, polyacrylonitrile-based polymers, copolymers of acrylonitrile and acrylic acid, (meth)acrylic acid or salts thereof, hydrogenated acrylonitrile butadiene rubber, and copolymers of hydrogenated nitrile rubber and hydrogenated butadiene acrylonitrile. The resin-type dispersant may be used alone or in combination of two or more types. The weight average molecular weight (Mw) of the resin-type dispersant is preferably 5,000 to 250,000, and more preferably 10,000 to 150,000.

In some embodiments, the carbon nanotube dispersion composition may further include a basic compound. As the basic compound, either organic compounds or inorganic compounds may be used, but basic inorganic compounds are preferable because such compounds allow for easy control of the stability of the dispersion system. Examples of basic inorganic compounds may include inorganic basic groups and inorganic metal salts.

As the inorganic basic groups and inorganic metal salts, compounds including at least one of alkali metals and alkaline earth metals are preferable. Specifically, examples may include chlorides, hydroxides, carbonates, nitrates, sulfates, phosphates, tungstates, vanadates, molybdates, niobates, and borates containing at least one of alkali metals and alkaline earth metals. Among these, chlorides, hydroxides, and carbonates containing at least one of alkali metals and alkaline earth metals are preferable because these substances can easily supply cations. Examples of alkali metal hydroxides may include lithium hydroxide, sodium hydroxide, and potassium hydroxide. Examples of alkaline earth metal hydroxides may include calcium hydroxide and magnesium hydroxide. Examples of alkali metal carbonates include lithium carbonate, lithium hydrogen carbonate, sodium carbonate, sodium hydrogen carbonate, potassium carbonate, and potassium hydrogen carbonate. Examples of alkaline earth metal carbonates include calcium carbonate and magnesium carbonate. Among the substances, at least one selected from the group consisting of lithium hydroxide, sodium hydroxide, lithium carbonate, and sodium carbonate is more preferable.

In some embodiments, the carbon nanotube dispersion composition may further include other optional components as needed, such as amine compounds, wetting agents, defoaming agents, surfactants, pH adjusting agents, wetting and penetrating agents, antioxidants, preservatives, antimold agents, leveling agents, thickeners, etc. The carbon nanotube dispersion composition may also include conductive materials other than the carbon nanotubes and polymer components to the extent that such materials do not interfere with the purpose of the invention. The optional components can be added at any timing, such as before the dispersion process, during the dispersion process, after the dispersion process of the carbon nanotube dispersion composition, etc.

In some embodiments, the carbon nanotube dispersion composition may further include a defoaming agent. As the defoaming agent, any component having a defoaming effect can be optionally used, such as commercially available defoaming agents, wetting agents, hydrophilic organic solvents, and water-soluble organic solvents. The defoaming agent may be used alone or in combination of two or more types.

Examples of the defoaming agent may include: alcohol-based agents such as ethanol, propanol, isopropanol, butanol, octyl alcohol, hexadecyl alcohol, acetylene alcohol, ethylene glycol monobutyl ether, methyl cellosolve, butyl cellosolve, propylene glycol monomethyl ether, acetylene glycol, polyoxyalkylene glycol, propylene glycol, and other glycols; fatty acid ester-based agents such as diethylene glycol laurate, glycerin monoricinoleate, alkenyl succinic acid derivatives, sorbitan monolaurate, sorbitan trioleate, polyoxyethylene monolaurate, polyoxyethylene sorbitan monolaurate, and natural waxes; amide-based agents such as polyoxyalkylene amide and acrylate polyamine: phosphate ester-based agents such as tributyl phosphate and sodium octyl phosphate; metal soap-based agents such as aluminum stearate and calcium oleate; oil and fat-based agents such as animal and vegetable oils, sesame oil, and castor oil; mineral oil-based agents such as kerosene and paraffin; and silicone-based agents such as dimethyl silicone oil, silicone paste, silicone emulsion, organically modified polysiloxane, and fluorosilicone oil.

In some embodiments, the carbon nanotube dispersion composition may further include a thickener. Examples of thickeners include polysaccharides such as carboxymethyl cellulose or salts thereof, polyvinylidene fluoride, and derivatives thereof. Commercially available examples include carboxymethyl cellulose #1190 (manufactured by Daicel Fine Chem Ltd.), etc. The thickener may be used alone or in combination of two or more types. The thickener may be used alone or in combination of two or more types.

(Solvent)

In some embodiments, the solvent is not particularly limited as long as it is within a range in which carbon nanotubes can be dispersed. The solvent may be, for example, water, any one of water-soluble organic solvents, or a mixed solvent containing two or more types. It is preferable that the solvent includes at least water. In the case where the solvent includes water, the content of water may be 50 parts by mass or more, 80 parts by mass or more, 90 parts by mass or more, 95 parts by mass or more, or 98 parts by mass or more with respect to the total solvent (100 parts by mass), and the remainder may include a water-soluble organic solvent. The entire solvent (100 parts by mass) may also be water. Also, as an embodiment, from the viewpoint of affinity to carbon nanotubes, it is preferable to include an amide-based organic solvent. In the case where the solvent includes an amide-based organic solvent, the content of the amide-based organic solvent may be 50 parts by mass or more, 80 parts by mass or more, 90 parts by mass or more, 95 parts by mass or more, or 98 parts by mass or more with respect to the total solvent (100 parts by mass). The entire solvent (100 parts by mass) may also be an amide-based organic solvent.

As water-soluble organic solvents, examples may include: alcohol-based solvents (methanol, ethanol, propanol, isopropanol, butanol, isobutanol, secondary butanol, tertiary butanol, benzyl alcohol, etc.), polyhydric alcohol-based solvents (ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, etc.), polyhydric alcohol ether-based solvents (ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether, propylene glycol monophenyl ether, etc.), amine-based solvents (ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine, etc.), amide-based solvents (N-methyl-2-pyrrolidone (NMP), N-ethyl-2-pyrrolidone (NEP), N,N-dimethylformamide, N,N-dimethylacetamide, N,N-diethylacetamide, N-methylcaprolactam, etc.), heterocyclics (cyclohexylpyrrolidone, 2-oxazolidone, 1,3-dimethyl-2-imidazolidinone, γ-butyrolactone, etc.), sulfoxide-based solvents (dimethyl sulfoxide, etc.), sulfone-based solvents (hexamethylphosphorotriamide, sulfolane, etc.), lower ketone-based solvents (acetone, methyl ethyl ketone, etc.), and others such as tetrahydrofuran, urea, and acetonitrile. Particularly, in the case of being used in a positive electrode mixture slurry, it is preferable to use an amide-based organic solvent as the water-soluble organic solvent. Among the amide-based organic solvents, from the viewpoint of affinity to carbon nanotubes and solubility of fluorine resin as a binder resin, it is preferable to include at least one selected from the group consisting of N-methyl-2-pyrrolidone (NMP) and N-ethyl-2-pyrrolidone (NEP). The water-soluble organic solvent may be used alone or in combination of two or more types.

(Properties of Carbon Nanotube Dispersion Composition)

The carbon nanotube dispersion composition may be specified by a complex modulus, a phase angle, or a combination thereof at 25° C. and a frequency of 10 Hz according to dynamic viscoelasticity measurement.

The carbon nanotube dispersion composition preferably has a complex modulus of 4 Pa or more at 25° C. and a frequency of 10 Hz according to dynamic viscoelasticity measurement, more preferably 10 Pa or more, even more preferably 20 Pa or more, and particularly preferably 30 Pa or more. Additionally, the complex modulus is preferably 250 Pa or less, more preferably 200 Pa or less, even more preferably 100 Pa or less, particularly preferably 80 Pa or less, and especially preferably 47 Pa or less. The carbon nanotube dispersion composition preferably has a complex modulus of 4 Pa or more and 250 Pa or less at 25° C. and a frequency of 10 Hz according to dynamic viscoelasticity measurement, and the complex modulus may also be 4 Pa or more and 200 Pa or less, 10 Pa or more and 100 Pa or less, 20 Pa or more and 80 Pa or less, or 20 Pa or more and 47 Pa or less.

The carbon nanotube dispersion composition preferably has a phase angle of 3° or more at 25° C. and a frequency of 10 Hz according to dynamic viscoelasticity measurement, more preferably 8° or more, even more preferably 12° or more, and particularly preferably 16° or more. Additionally, the phase angle is preferably 60° or less, more preferably 45° or less, even more preferably 35° or less, and particularly preferably 31° or less. The carbon nanotube dispersion composition preferably has a phase angle of 3° or more and 60° or less at 25° C. and a frequency of 10 Hz according to dynamic viscoelasticity measurement, and the phase angle is desirable to be 8° or more and 60° or less, 16° or more and 60° or less, or 16° or more and 35° or less.

Additionally, the carbon nanotube dispersion composition may satisfy the ranges for both of the complex modulus and the phase angle at 25° C. and a frequency of 10 Hz according to dynamic viscoelasticity measurement.

The complex modulus and the phase angle can be evaluated by using dynamic viscoelasticity measurement. The better the dispersibility of carbon nanotubes and the lower the viscosity of the carbon nanotube dispersion composition, the smaller the complex modulus of the carbon nanotube dispersion composition tends to be. Additionally, the phase angle represents the phase shift of the stress wave in the case where the strain applied to the carbon nanotube dispersion composition is assumed to be a sine wave. For a simple elastic body, the stress wave is a sinus wave of the same phase as the strain, so the phase angle is 0°. Meanwhile, for a simple viscous body, the stress wave is 90° ahead. For a typical sample used for viscoelasticity measurement, the stress wave is a sinus wave whose phase angle is greater than 0° and less than 90°. If the dispersibility of the carbon nanotubes in the carbon nanotube dispersion composition is favorable, the phase angle approaches 90°, which is a property of a simple viscous body.

In the case where the fiber length of the carbon nanotubes in the carbon nanotube dispersion composition is large, even if the dispersion is good, the complex modulus may be at a high value because of the structural viscosity possessed by the carbon nanotubes themselves. However, a carbon nanotube dispersion composition with a complex modulus and a phase angle value within such ranges exhibits good dispersion particle size and dispersibility of carbon nanotubes. Therefore, such carbon nanotube dispersion composition can be suitably used as a carbon nanotube dispersion composition for non-aqueous electrolyte secondary batteries.

The complex modulus and the phase angle of the carbon nanotube dispersion composition at 25° C. and a frequency of 10 Hz according to dynamic viscoelasticity measurement are determined in accordance with the measurement method used in the examples.

The cumulative particle size D50 of the carbon nanotube dispersion composition is preferably 300 nm to 7000 nm, and more preferably 700 nm to 3000 nm. The cumulative particle size D50 of the carbon nanotube dispersion composition can be measured on a volume basis using a particle size distribution analyzer (for example, Partica LA-960V2, manufactured by HORIBA, Ltd.).

The pH of the carbon nanotube dispersion composition may be 3 to 6. The pH of the carbon nanotube dispersion composition is preferably 4 to 6, and more preferably 4 to 5. The pH of the carbon nanotube dispersion composition can be measured by using a pH meter (for example, pH METER F-52, manufactured by HORIBA, Ltd.).

The viscosity of the carbon nanotube dispersion composition is preferably 10 mPa·s or more and less than 10000 mPa·s, and more preferably 10 mPa·s or more and less than 2000 mPa·s, when measured at 25° C. using a B-type viscometer at 60 rpm.

In an embodiment, the content of the carbon nanotubes in the carbon nanotube dispersion composition is preferably 0.1 parts by mass or more, more preferably 0.2 parts by mass or more, and even more preferably 0.5 parts by mass or more, with respect to 100 parts by mass of the carbon nanotube dispersion composition. Within such ranges, at the time of providing a mixture slurry, the carbon nanotube dispersion composition can be more appropriately mixed and dispersed with the active substance at a quantity ratio at which multiple particles of the active substance correspond to one carbon nanotube.

The content of carbon nanotubes in the carbon nanotube dispersion composition is preferably 20 parts by mass or less, more preferably 10 parts by mass or less, even more preferably 5 parts by mass or less, and may also be 3 parts by mass or less, with respect to 100 parts by mass of the carbon nanotube dispersion composition. Within such ranges, the dispersibility of the carbon nanotube dispersion composition can be maintained more favorably. Furthermore, as the dispersibility is maintained in the carbon nanotube dispersion composition, at the time of providing an electrode film using the mixture slurry, the carbon nanotubes maintain the linearity in the electrode film, the number of particles of the active substance in contact with a single carbon nanotube increases, and the performance of the secondary battery can be further enhanced.

For example, the content of the carbon nanotubes in the carbon nanotube dispersion composition is preferably 0.2 parts by mass to 20 parts by mass, preferably 0.5 parts by mass to 10 parts by mass, and more preferably 0.5 parts by mass or more to 3 parts by mass, with respect to 100 parts by mass of the carbon nanotube dispersion composition.

In an embodiment, from the viewpoint of dispersion stability, the amount of the dispersant in the carbon nanotube dispersion composition is preferably 10 parts by mass or more, more preferably 20 parts by mass or more, even more preferably 40 parts by mass or more, and may be 60 parts by mass or more, with respect to 100 parts by mass of carbon nanotubes. From the viewpoint of dispersion stability, the amount of the dispersant in the carbon nanotube dispersion composition is preferably 300 parts by mass or less, more preferably 200 parts by mass or less, more preferably 120 parts by mass or less, and may be 100 parts by mass or less, with respect to 100 parts by mass of carbon nanotubes. For example, the amount of the dispersant in the carbon nanotube dispersion composition is preferably 10 parts by mass to 300 parts by mass, more preferably 40 parts by mass to 200 parts by mass, even more preferably 60 parts by mass to 120 parts by mass, and may be 70 parts by mass to 100 parts by mass, with respect to 100 parts by mass of carbon nanotubes.

In an embodiment, a non-volatile content of the carbon nanotube dispersion composition is 80 mass % or more, 90 mass % or more, 95 mass % or more, or 98 mass % or more, with respect to 100 mass % of carbon nanotubes, and the remainder may be a solvent. Here, the non-volatile content refers to the mass of the dried coating film of the carbon nanotube dispersion composition. In the case where components other than the carbon nanotubes, the dispersant, and the solvent are included in the carbon nanotube dispersion composition, the amount of other components in the carbon nanotube dispersion composition may be 0.1 parts by mass to 10 parts by mass, 0.5 parts by mass to 5 parts by mass, or 1 parts by mass to 3 parts by mass, with respect to 100 parts by mass of the carbon nanotube dispersion composition.

In the case where a basic compound is included in the carbon nanotube dispersion composition, the amount of the basic compound in the carbon nanotube dispersion composition may be 0.01 parts by mass to 1 parts by mass, 0.02 parts by mass to 0.5 parts by mass, or 0.04 parts by mass to 0.1 parts by mass, with respect to 100 parts by mass of the carbon nanotube dispersion composition. In the case where a basic compound is included in the carbon nanotube dispersion composition, the amount of the basic compound in the carbon nanotube dispersion composition may be 1 parts by mass to 20 parts by mass, 2 parts by mass to 10 parts by mass, or 4 parts by mass to 8 parts by mass, with respect to 100 parts by mass of the dispersant.

In the case where a defoaming agent is included in the carbon nanotube dispersion composition, the amount of the defoaming agent in the carbon nanotube dispersion composition may be 0.01 parts by mass to 1 part by mass, 0.02 parts by mass to 0.5 parts by mass, or 0.04 parts by mass to 0.1 parts by mass, with respect to 100 parts by mass of the carbon nanotube dispersion composition.

(Manufacturing Method of Carbon Nanotube Dispersion Composition)

The manufacturing method of the carbon nanotube dispersion composition is not particularly limited, but can be performed by mixing a carbon nanotube raw material, a dispersant, and a solvent all at once or in separate steps. The carbon nanotube raw material described above can be used. In addition, in the case where the dispersion process is performed after mixing, the dispersion process may be performed so that the carbon nanotubes in the obtained carbon nanotube dispersion composition possess the predetermined average outer diameter and linearity index. The dispersion apparatus used to perform the dispersion process is not particularly limited.

As the dispersion device, a disperser normally used for pigment dispersion and the like can be used. Examples may include: mixer types such as dispersers, homomixers, and planetary mixers; homogenizer types (such as BRANSON's Advanced Digital Sonifer (registered trademark), MODEL 450DA, M-Technique's "Clearmix", PRIMIX's "Filmix", Silverson's "Abramix", etc.); paint conditioners (manufactured by Red Devil); colloid mill types (such as PUC's "PUC Colloid Mill", IKA's "Colloid Mill MK"); cone mills (such as "Cone Mill MKO" manufactured by IKA); media-type dispersers including ball mills, sand mills (such as "Dyno-mill" manufactured by Shinmaru Enterprises), attritors, pearl mills (such as "DCP Mill" manufactured by Eirich), and co-ball mill, etc.; media-less dispersers including wet jet mills (such as "Genus PY" manufactured by Genus, "Star Burst" manufactured by Sugino Machine, "Nanomizer" manufactured by Nanomizer), "Clear SS-5" manufactured by M-Technique, "MICROS" manufactured by Nara Machinery; and other roll mills. However, the invention is not limited thereto.

In several embodiments, it is preferable to perform a dispersion process for preparing the carbon nanotube dispersion composition by using a homogenizer, a media-type disperser, a media-less disperser, or a combination thereof. The dispersion process using a homogenizer is preferably performed under a high pressure of 60 MPa to 150 MPa. In the case where the dispersion process is performed by using a media-type disperser, it is preferable to use beads such as zirconia beads. The diameter of the beads to be used is preferably smaller than 1.25 mm, and more preferably 1.0 mm or less.

In the dispersion process, it is preferable to use a homogenizer, and the homogenizer may be used alone or in combination with at least one of a media-type disperser and a media-less disperser. In the dispersion process, in order to prevent the carbon nanotubes from breaking due to the collision between the media and the carbon nanotubes, the dispersion process may also be performed by adopting a method without using a media-type disperser. In such case, the dispersion process may be performed by using a homogenizer alone or in combination with a media-less disperser. For example, by performing wet kneading as a media-less disperser before and after the dispersion process of the homogenizer, the fiber length of the carbon nanotubes can be maintained, and carbon nanotubes with a more appropriate range of linearity index can be included in the dispersion composition.

Examples of commercially available homogenizers may include, but are not limited to, "R-MODEL such as R5, G-MODEL such as G5" manufactured by MST Corporation, "Star Burst" manufactured by Sugino Machine Limited, and "OMEGA" manufactured by Ashizawa Finetech Ltd. Examples of commercially available media-less dispersers include, but are not limited to, "3L Kneader" manufactured by Inoue Mfg., Inc., "Planetary Mixer" manufactured by Inoue Mfg., Inc., "Plastomill" manufactured by Toyo Seiki Seisaku-sho, Ltd., "Twin-screw Kneading Extruder PCM30" manufactured by Ikegai Corporation, and "MIXING ROLL MILL" manufactured by Inoue Mfg., Inc.

<Carbon nanotube resin composition> According to several embodiments, a carbon nanotube resin composition is provided. The carbon nanotube resin composition includes carbon nanotubes, a dispersant, a solvent, and a binder. The carbon nanotube resin composition may also include a carbon nanotube dispersion composition and a binder. The binder is described below.

<Binder>

The binder is a resin for binding substances such as carbon nanotubes together.

As the binder, examples may include: polymers or copolymers containing as constituent units, such as ethylene, propylene, vinyl chloride, vinyl acetate, vinyl alcohol, maleic acid, acrylic acid, acrylic acid ester, methacrylic acid, methacrylic acid ester, acrylonitrile, styrene, vinyl butyral, vinyl acetal, vinylpyrrolidone, etc.; polyurethane resin, polyester resin, phenol resin, epoxy resin, phenoxy resin, urea resin, melamine resin, alkyd resin, acrylic resin, formaldehyde resin, silicone resin, and fluorine resin; cellulose resins such as carboxymethyl cellulose; rubber materials such as styrene-butadiene rubber and fluorine rubber; conductive resins such as polyaniline, polyacetylene, etc. Examples of fluorine resins may include polytetrafluoroethylene. The binder may also be a modified product, a mixture, or a copolymer of the resins. Among the above, it is preferable that the binder includes at least one selected from the group consisting of carboxymethyl cellulose, styrene butadiene rubber, and polyacrylic acid.

It is preferable that the carboxymethyl cellulose used as a binder has a high viscosity. For example, when preparing a 1% aqueous solution of carboxymethyl cellulose, the viscosity is preferably 500 mPa·s to 6000 mPa·s, and more preferably 1000 mPa·s to 3000 mPa·s. The viscosity of a 1% aqueous solution of carboxymethyl cellulose can be measured by using a B-type viscometer rotor, under the condition of 25° C., at a rotation speed of 60 rpm.

It is preferable that the carboxymethyl cellulose used as a binder has a high degree of etherification. For example, it is preferable that the degree of etherification is 0.6 to 1.5, and more preferably 0.8 to 1.2.

The styrene butadiene rubber used as the binder resin may be generally used as an electrode binding material if it is an oil-in-water emulsion. In an embodiment, it is preferable that the binder includes an emulsion of styrene butadiene rubber. For example, "TRD2001" manufactured by JSR Corporation can be suitably used.

The type and the content ratio of the binder are appropriately selected according to the properties of coexisting substances such as carbon nanotubes and active substances. In the carbon nanotube resin composition, the content of the binder may be 1 part by mass to 100 parts by mass, 5 parts by mass to 500 parts by mass, or 10 parts by mass to 30 parts by mass with respect to 1 part by mass of carbon nanotubes.

The carbon nanotube resin composition includes carbon nanotubes, a dispersant, a solvent, and a binder, and can be obtained by mixing the components all at once or in separate steps. In another example, the carbon nanotube resin composition includes a carbon nanotube dispersion composition and a binder, and can be obtained by mixing the binder with the carbon nanotube dispersion composition. In either method, it is preferable that the average outer diameter and the linearity index of the carbon nanotubes in the obtained carbon nanotube resin composition satisfy the ranges described for the carbon nanotube dispersion composition.

For example, in the mixing of the carbon nanotube dispersion composition and the binder, the dispersion apparatus described for the carbon nanotube dispersion composition may be used to prevent the breakage of carbon nanotubes due to mixing. Accordingly, the average outer diameter and the linearity index of the carbon nanotubes can be maintained within a predetermined range in the carbon nanotube resin composition as well.

The carbon nanotube resin composition may further include an additional optional component. The additional optional component may be those described for the carbon nanotube dispersion composition mentioned above.

<Mixture Slurry>

According to several embodiments, a mixture slurry is provided. The mixture slurry includes carbon nanotubes, a dispersant, a solvent, a binder, and an active substance. The mixture slurry may also include a carbon nanotube resin composition and an active substance, or the mixture slurry may also include a carbon nanotube dispersion composition, a binder, and an active substance. The active substance is described below.

(Active Substance)

The active substance is a material that serves as the basis for battery reaction. The active substance can be divided into a positive electrode active substance and a negative electrode active substance based on the electromotive force.

As for the positive electrode active substance, although not particularly limited, metal compounds such as metal oxides and metal sulfides capable of doping or intercalating lithium ions, and conductive polymers can be used.

Examples may include inorganic compounds such as oxides of transition metals like Fe, Co, Ni, Mn, composite oxides with lithium, and transition metal sulfides. Specifically, examples may include transition metal oxide powders such as MnO, $V_2O_5$, $V_6O_{13}$, $TiO_2$, composite oxide powders of lithium and transition metals in a layered structure such as lithium nickelate, lithium cobaltate, lithium manganate, lithium and transition metals in a spinel structure such as lithium manganate, lithium iron phosphate materials which are phosphate compounds in an olivine structure, transition metal sulfide powders such as $TiS_2$, FeS.

The positive electrode substance may also be an organic compound. For example, conductive polymers such as polyaniline, polyacetylene, polypyrrole, and polythiophene can also be used. As the positive electrode substance, a mixture of the inorganic compounds and the organic compounds may be used.

As for the negative electrode active substance, there is no particular limitation as long as the material is capable of doping or intercalating lithium ions. Examples may include metal Li, alloys such as tin alloys, silicon alloys, lead alloys, metal oxides such as $Li_xFe_2O_3$, $LiXFe_3O_4$, $Li_xWO_2$ (where x is a number satisfying $0<x<1$), lithium titanate, lithium vanadate, lithium silicate, conductive polymers such as polyacetylene, poly-p-phenylene, carbon-based materials such as amorphous carbon materials like soft carbon and hard carbon, artificial graphite such as highly graphitized carbon materials and natural graphite and other graphite materials, carbon black, mesophase carbon black, resin-baked carbon materials, vapor-grown carbon fibers, and carbon fibers. The negative electrode active substances can be used alone or in combination of two or more.

In an embodiment, as the negative electrode active substance, silicon-based negative electrode active substances, which are negative electrode active substances containing silicon such as silicon alloys and lithium silicate, are preferred.

As the silicon-based negative electrode active substance, examples may include the following: so-called metallurgical grade silicon produced by reducing silicon dioxide by using carbon; industrial grade silicon obtained by reducing impurities in metallurgical grade silicon through acid treatment or unidirectional solidification; high-purity silicon with different crystalline states such as single crystal, polycrystalline, and amorphous, of a high purity produced from silane obtained by reacting silicon; and silicon that has been made high-purity while adjusting the crystalline state and the precipitation state by methods such as performing a sputtering process and an electron beam (EB) deposition process on industrial grade silicon.

Additionally, examples may include compounds of silicon and oxygen, such as silicon oxide, silicon and various alloys, and those prepared by adjusting the crystalline states through a process such as rapid cooling. Among the above, a silicon-based negative electrode active substance is preferred, which is a mixture of silicon nanoparticles and silicon oxide having a structure in which silicon nanoparticles are dispersed in silicon oxide, the outer side of the mixture being coated with a carbon film.

In an embodiment, in addition to the silicon-based negative electrode active substance, the negative electrode active substance may also include materials such as carbonaceous, graphitic carbonaceous, or graphitic materials as carbon materials. For example, amorphous carbonaceous materials such as soft carbon and hard carbon can be adopted as the carbonaceous materials. As the graphitic materials, examples may include artificial graphite and natural graphite such as highly graphitized carbon materials. Among the above, it is preferred to use powders of graphitic materials such as artificial graphite and natural graphite.

The amount of the silicon-based negative electrode active substance is preferably 3 mass % to 50 mass % and more preferably 5 mass % to 25 mass %, when the carbon material such as artificial graphite and natural graphite is taken as 100 mass %.

In an embodiment, the BET specific surface area of the active substance is preferably 0.1 $m^2/g$ to 10 $m^2/g$, more preferably 0.2 $m^2/g$ to 5 $m^2/g$, and even more preferably 0.3 $m^2/g$ to 3 $m^2/g$.

In an embodiment, the average particle diameter of the active substance is preferably in the range of 0.5 μm to 50 μm, and more preferably in the range of 2 μm to 20 μm. The "average particle diameter of the active substance" described in the disclosure refers to the average value of the particle diameter (long diameter) of the active substance measured by electron microscopy.

(Manufacturing Method of Mixture Slurry)

The mixture slurry can be prepared by various conventional methods. Examples may include a method of mixing the active substance with the carbon nanotube resin composition, or mixing the binder and the active substance with the carbon nanotube dispersion composition all at once or in separate steps. The carbon nanotubes, the dispersant, the solvent, the binder, and the active substance may be mixed all at once or in separate steps to obtain the mixture slurry.

Preferably, the mixture slurry can be obtained by mixing the active substance and the binder with the carbon nanotube dispersion composition all at once or in separate steps. In such process, the average outer diameter and the linearity index of the carbon nanotubes in the carbon nanotube dispersion composition can be more appropriately adjusted to a predetermined range, and the control of the dispersion condition in the subsequent adjustment of the mixture slurry becomes simpler.

In an embodiment, it is preferable to further perform a dispersion process after the active substance is added to the carbon nanotube dispersion composition or the carbon nanotube resin composition to obtain the mixture slurry. The dispersion apparatus used to perform the dispersion process is not particularly limited. The mixture slurry can be prepared by using the dispersion apparatus described for the carbon nanotube dispersion composition.

In an embodiment, the amount of the active substance in the mixture slurry is preferably 20 parts by mass to 90 parts by mass, more preferably 30 parts by mass to 80 parts by mass, and even more preferably 40 parts by mass to 60 parts by mass, with respect to 100 parts by mass of the mixture slurry.

In an embodiment, the amount of the carbon nanotubes in the mixture slurry is preferably 0.01 to 10 parts by mass, more preferably 0.05 to 5 parts by mass, even more preferably 0.1 to 1 part by mass, and most preferably 0.15 to 0.5 parts by mass, with respect to 100 parts by mass of the active substance.

In an embodiment, the amount of the binder in the mixture slurry is preferably 0.1 mass % to 30 mass %, more preferably 0.5 mass % to 20 mass %, even more preferably 1 mass % to 10 mass %, and most preferably 1.5 mass % to 5 mass %, with respect to 100 parts by mass of the active substance.

The amount of the binder in the mixture slurry may be more appropriately controlled according to the type of the binder. For example, in the case where the mass of the active substance is set as 100 parts by mass, the usage amount of carboxymethyl cellulose as the binder is preferably 0.5 mass % to 3.0 mass %, and more preferably 1.0 mass % to 2.0 mass %. In the case where the mass of the active substance is set as 100 parts by mass, the usage amount of styrene butadiene rubber is preferably 0.5 mass % to 3.0 mass %, and more preferably 1.0 mass % to 2.0 mass %. In the case where the mass of the active substance is set as 100 parts by mass, the usage amount of polyacrylic acid is preferably 1 mass % to 25 mass %, and more preferably 5 mass % to 20 mass %.

The mixture slurry may further include other additives. Such other additives may be those described for the carbon nanotube dispersion composition. For example, from the viewpoint of coating properties on the substrate, a thickener may be additionally included in the mixture slurry.

In an embodiment, the amount of the solid content in the mixture slurry is preferably 30 mass % to 90 mass %, more preferably 30 mass % to 80 mass %, and even more preferably 40 mass % to 70 mass %, with respect to 100 parts by mass of the mixture slurry. Here, the solid content of the mixture slurry refers to components that can form a coating film without volatilizing during a solvent removal process in the coating film.

<Electrode Film>

According to several embodiments, an electrode is provided. The electrode film can be used in a secondary battery, typically represented by a lithium ion secondary battery. For example, the electrode film can be provided as an electrode composite layer formed on a current collector in a secondary battery. The electrode film can be obtained by forming the mixture slurry into a film-like shape. For example, the electrode film may be a coating film obtained by coating and drying the mixture slurry on a current collector.

The current collector on which the electrode film is provided is not particularly limited. The materials and the shapes applicable to various secondary batteries can be selected as appropriate. For example, the material for the current collector includes metals such as aluminum, copper, nickel, titanium, and stainless steel, as well as alloys thereof. As the shape of the current collector, it may generally be in the form of a flat foil, but current collectors with roughened surfaces, perforated foil shapes, and mesh shapes can also be used.

There is no particular restriction on the method for coating the mixture slurry on the current collector, and conventional methods can be used. Specifically, examples may include methods such as die coating, dip coating, roll coating, doctor coating, knife coating, spray coating, gravure coating, screen printing, and electrostatic coating, etc. For the drying method, natural drying, forced air drying machine, hot air drying machine, infrared heating machine, far-infrared heating machine, etc., can be used. However, the invention is not limited thereto.

After coating, a rolling process may be performed by using a flat press and calendar rolls. The thickness of the electrode film is generally 1 µm or more and 500 µm or less, and preferably 10 µm or more and 300 µm or less.

<Non-Aqueous Electrolyte Secondary Battery>

According to several embodiments, a non-aqueous electrolyte secondary battery is provided. The non-aqueous electrolyte secondary battery may specifically be a lithium ion secondary battery. The non-aqueous electrolyte secondary battery includes a positive electrode, a negative electrode, and an electrolyte. In the secondary battery, at least one of the positive electrode and the negative electrode may include an electrode film, and the electrode film may be an electrode film according to an embodiment. The electrode film according to an embodiment may be a coating film of the mixture slurry according to an embodiment, or the electrode film may be an electrode film obtained by using a carbon nanotube dispersion composition or a carbon nanotube resin composition according to an embodiment.

One or both of the positive electrode and the negative electrode may include an electrode film according to an embodiment. In addition, the negative electrode including an electrode film according to an embodiment can contribute more to the improvement of rate properties and cycle properties. For example, in the case where the negative electrode includes a silicon-based active substance, the cycle properties tend to deteriorate due to volume change due to charging and discharging. However, by using the electrode film according to an embodiment, the conductivity between the particles of the active substance can be maintained before and after the volume change, thereby suppressing the deterioration of cycle properties.

As the positive electrode, an electrode film prepared by coating and drying the mixture slurry containing the positive electrode active substance on the current collector can be used.

As the negative electrode, an electrode film prepared by coating and drying the mixture slurry containing the negative electrode active substance on the current collector can be used.

As the electrolyte, various conventional compounds that allow ion movement can be used. Compounds that can be used as the electrolyte may include, for example, lithium salts such as $LiBF_4$, $LiClO_4$, $LiPF_6$, $LiAsF_6$, $LiSbF_6$, $LiCF_3SO_3$, $Li(CF_3SO_2)_2N$, $LiC_4F_9SO_3$, $Li(CF_3SO_2)_3C$, LiI, LiBr, LiCl, $LiAlCl$, $LiHF_2$, LiSCN, or $LiBPh_4$ (where Ph is a phenyl group). However, the invention is not limited, and compounds including sodium salts and calcium salts can also be used. It is preferable to use the electrolyte dissolved in a non-aqueous solvent as an electrolyte solution.

As the non-aqueous solvent, although not particularly limited, examples may include: carbonates such as ethylene carbonate, propylene carbonate, butylene carbonate, dimethyl carbonate, ethyl methyl carbonate, and diethyl carbonate; lactones such as γ-butyrolactone, γ-valerolactone, and γ-octanoic lactone; glymes such as tetrahydrofuran, 2-methyltetrahydrofuran, 1,3-dioxolane, 4-methyl-1,3-dioxolane, 1,2-methoxyethane, 1,2-ethoxyethane, and 1,2-dibutoxyethane; esters such as methyl formate, methyl acetate, and methyl propionate; sulfoxides such as dimethyl sulfoxide and sulfolane; and nitriles such as acetonitrile. Such solvents may be used alone or in a mixture of two or more types.

According to an embodiment, the secondary battery preferably includes a separator. As examples, the separator may be formed by polyethylene nonwoven fabric, polypropylene nonwoven fabric, polyamide nonwoven fabric, and those subjected to a hydrophilic process. However, the invention is not limited thereto.

The shape of the secondary battery may be of a paper type, a cylindrical type, a button type, and a laminated type, etc., and may be of various shapes in accordance with the purpose of use.

Other Examples

According to several embodiments, a manufacturing method for a carbon nanotube dispersion composition by using carbon nanotubes can be provided. More specifically, manufacture of a carbon nanotube dispersion composition for an electrode material of a secondary battery by using carbon nanotubes can be provided. For example, a manufacturing method for a non-aqueous electrolyte secondary battery, more specifically a negative electrode of a lithium ion secondary battery, and even more specifically a carbon nanotube dispersion composition used in a negative electrode including a silicon-based substance can be provided. The carbon nanotubes used in such manufacturing method may be a carbon nanotube raw material described in the carbon nanotube dispersion composition. For example, the carbon nanotubes should at least satisfy the average outer diameter and the linearity index within the ranges described in the carbon nanotube raw material, and may optionally satisfy one or both of the BET specific surface area and the G/D ratio, and further optionally satisfy an arbitrary other physical property value.

According to several embodiments, a manufacturing method for a carbon nanotube resin composition using carbon nanotubes, a method for a mixture slurry by using carbon nanotubes, a manufacturing method for an electrode film using carbon nanotubes, and a manufacturing method of a secondary battery by using carbon nanotubes can be provided. The carbon nanotubes are as described above.

Furthermore, according to several embodiments, the use of carbon nanotubes for carbon nanotube dispersion compositions, carbon nanotube resin compositions, mixture slurries, electrode films, and secondary batteries can be provided. The carbon nanotubes are as described above. The description may be related to various methods of using carbon nanotubes particularly for a negative electrode of a non-aqueous electrolyte secondary battery, more specifically a lithium ion secondary battery, and more particularly a negative electrode including a silicon-based active substance.

According to the embodiments, it is possible for carbon nanotubes exhibiting an average outer diameter and linearity index satisfying a predetermined range to be included in an electrode film in one or both of the positive electrode and negative electrode. As a result, the rate properties and the cycle properties of the secondary battery can be improved.

EXAMPLES

The invention will be described more specifically below with reference to examples. The invention is not limited to the following examples as long as the invention does not exceed the gist thereof. In the examples, carbon nanotubes may be referred to as "CNT". Unless otherwise specified, "parts" refers to "parts by mass" and "%" refers to "mass %".

Table 1 shows the formulation and evaluation results of CNT dispersion compositions. Table 2 shows the formulation of mixture slurries for negative electrodes. Table 3 shows the formulation of mixture slurries for positive electrode. Tables 4 and 5 show the rate properties and the cycle properties of the secondary batteries using the electrodes prepared in the examples and the comparative examples for negative and positive electrodes, respectively. Tables 2 and 3 show the mass % of each component per 100 mass % of the non-volatile components, as well as the total mass % of the non-volatile components per 100 mass % of the mixture slurry.

<1> Measurement Methods for Physical Properties

The measurement methods for physical properties used in the examples are described below.

(1) Average Outer Diameter of CNT

Regarding the average outer diameter of the CNT dispersion composition, samples were prepared by using the CNT dispersion composition as shown in Table 1 according to the following, and the average outer diameter was measured by using the samples.

Sample preparation: The CNT dispersion composition was diluted with a solvent to achieve a CNT concentration of 0.048 mass %. After spray-coating several microliters of the diluted dispersion composition onto a mica substrate, it is dried on a hot plate at 100° C. to prepare a substrate for observing the average outer diameter of CNTs. Subsequently, the surface of the prepared substrate was sputtered with platinum. Regarding the solvent, the solvent used at the time of preparing the CNT dispersion composition was used.

Measurement method: The carbon nanotubes were observed and imaged by using a scan-type electron microscope (manufactured by JEOL Ltd.) Next, 300 arbitrary carbon nanotubes were selected from multiple observed images, and the respective outer diameters were measured. Then, the average outer diameter (nm) of the carbon nanotubes was calculated as the number average of the outer diameters.

(2) Linearity Index

Regarding the linearity index of the CNT dispersion composition, samples were prepared by using the CNT dispersion composition as shown in Table 1 according to the following, and the average outer diameter was measured by using the samples.

Sample preparation: The CNT dispersion composition was diluted with a solvent to achieve a CNT concentration of 0.048 mass %. After spray-coating several microliters of the diluted dispersion composition onto a mica substrate, it is dried on a hot plate at 100° C. to prepare a substrate for observing the fiber lengths of CNTs. Subsequently, the surface of the prepared substrate was sputtered with platinum. Regarding the solvent, the solvent used at the time of preparing the CNT dispersion composition was used.

Measurement method: SEM images of the sample pieces were obtained by using a scan-type electron microscope (manufactured by JEOL. Ltd.) At this time, it is set so that the shapes of 50 to 200 carbon nanotubes can be observed in one field of view. The SEM images were captured under the condition of 4.63 nm per pixel. An error range of 4.63 nm±10% is acceptable for the imaging condition. The SEM images were obtained by moving the field of view until a total of 1000 to 3000 carbon nanotubes can be observed.

Software: The SEM images were analyzed by using image analysis software "WinROOF2015" (manufactured by Mitani Corporation) to calculate the absolute maximum length and the skeleton length for each carbon nanotube. The linearity was calculated using the following equation:

$$\text{Linearity} = \text{Absolute maximum length}/\text{Skeleton length}$$

The absolute maximum length is the distance between two points that are farthest apart in the target pixel group.

The skeleton length is the length of the free curve formed by the target pixel group Next, for each field of view in the SEM image, a number a of carbon nanotubes with a skeleton length of 1 μm or more is calculated, and a number b of carbon nanotubes with a skeleton length of 1 μm or more and a linearity of 0.9 or more is calculated. The linearity index was then calculated as follows:

$$\text{Linearity index (\%)} = (b/a) \times 100$$

(3) G/D Ratio

Regarding the G/D ratio of the CNT dispersion composition, samples were prepared by using the CNT dispersion composition as shown in Table 1 according to the following, and the G/D ratio was measured by using the samples.

Sample preparation: The carbon nanotube dispersion composition was coated on a glass substrate (with a thickness of 2 mm) by using a K CONTROL COATER (No. 150) manufactured by KR PRINTCOAT, and was dried to obtain a coating film. Drying was performed by placing the sample in an oven (SPHH-201 manufactured by ESPEC CORP.) at 120° C. for 5 minutes.

Measurement method: The CNT was placed in a Raman microscope (XploRA, manufactured by HORIBA, Ltd.) and measured by using a laser wavelength of 532 nm. The measurement conditions were as follows: an acquisition time of 60 seconds, an accumulation count of 2 times, an attenuation filter of 10%, an objective lens magnification of 20×, confocal holes of 500, a slit width of 100 μm, and a measurement wavelength range of 100 $cm^{-1}$ to 3000 $cm^{-1}$. In the obtained peaks, the maximum peak intensity within the range of 1560 $cm^{-1}$ to 1600 $cm^{-1}$ in the spectrum was set as G, and the maximum peak intensity within the range of 1310 cm 1 to 1350 $cm^{-1}$ was set as D. The ratio of G/D was calculated and used as the G/D ratio of the CNT.

(4) BET Specific Surface Area

Regarding the BET specific surface area of the CNT dispersion composition, samples were prepared by using the CNT dispersion composition as shown in Table 1 according to the following, and the BET specific surface area was measured according to the following by using the samples. Preparation of samples: 100 mL of the carbon nanotube dispersion composition was measured into a 500 mL round-bottom flask and frozen for 5 hours in a −95° C. ethanol bath using a freeze dryer (FDU-1200/UT-4000 manufactured by EYELA), and then dried under a reduced pressure at 10 Pa to 30 Pa for 20 hours to obtain carbon nanotube powder. Subsequently, the obtained carbon nanotube powder was passed through a 60-μm mesh.

Measurement method: 0.03 g of CNT was weighed by using an electronic balance (MSA225S100DI manufactured by Sartorius) and then dried at 110° C. for 15 minutes while degassing. Subsequently, by using a fully automatic specific surface area measurement device (HM-model1208 manufactured by MOUNTECH), the BET specific surface area of the carbon nanotube powder was measured. The mass used as the denominator for calculating the specific surface area was set as the mass of the carbon nanotubes.

(5) Complex Modulus

The complex modulus of the CNT dispersion composition was evaluated by performing dynamic viscoelasticity measurement using a rheometer (RheoStress1 rotational rheometer manufactured by Thermo Fisher Scientific Inc.) with a diameter of 35 mm, a cone of 2° at 25° C. and a frequency of 10 Hz, in the range of the strain rate of 0.01% to 5%.

(6) Phase Angle

The phase angle of the CNT dispersion composition was evaluated by performing dynamic viscoelasticity measurement by using a rheometer (RheoStress1 rotational rheometer manufactured by Thermo Fisher Scientific Inc.) with a diameter of 35 mm, a cone of 2° at 25° C. and a frequency of 10 Hz, in the range of the strain rate of 0.01% to 5%.

<Preparation of Standard Positive Electrode>

The standard positive electrode used in the following examples and comparative examples was prepared by the method described below.

First, 68.8 parts by mass of a positive electrode active substance (HED (registered trademark) NCM-111 1100 manufactured by BASF TODA Battery Materials LLC), 3.0 parts by mass of acetylene black (DENKA BLACK (registered trademark) HS100 manufactured by Denka Company Limited), and 2.2 parts by mass of PVdF (polyvinylidene fluoride, KUREHA KF POLYMER W #1300 manufactured by Kureha Battery Materials Japan Co., Ltd.) were added to a plastic container with a capacity of 150 cm$^3$, and then mixed using a spatula until the powder became uniform. Subsequently, 15.2 parts by mass of NMP was added, and the mixture was stirred for 30 seconds at 2000 rpm by using a rotation/revolution mixer (THINKY MIXER, ARE-310, manufactured by THINKY Corporation). After that, the mixture in the plastic container was mixed by using a spatula until the mixture became uniform, and then the mixture was stirred for 30 seconds at 2000 rpm by using the rotation/revolution mixer. Furthermore, 10.8 parts by mass of NMP was added, and the mixture was stirred for 30 seconds at 2000 rpm by using the rotation/revolution mixer. Finally, the mixture was stirred for 10 minutes at 3000 rpm by using a high-speed stirrer to obtain a positive electrode mixture slurry.

Next, the positive electrode mixture slurry was coated onto an aluminum foil with a thickness of 20 μm by using an applicator and a coating film was formed. Then, the coating film was dried in an electric oven at 120° C.±5° C. for 25 minutes, and the basis weight per unit area of the electrode was adjusted to 20 mg/cm$^2$. Furthermore, a rolling process was performed by using a roll press (3t hydraulic roll press manufactured by Thank-metal Co., Ltd.) to prepare a standard positive electrode with an electrode film (dried coating film) having a density of 3.1 g/cm$^3$.

<Preparation of Standard Negative Electrode>

The standard negative electrode used in the following examples and comparative examples was prepared by the method described below.

In a plastic container with a capacity of 150 ml. 0.3 parts by mass of acetylene black (DENKA BLACK (registered trademark) HS-100, manufactured by Denka Company Limited), 0.5 parts by mass of CMC (carboxymethyl cellulose #1190, manufactured by Daicel FineChem Ltd., non-volatile content 100%), and 47.9 parts by mass of water were added. The mixture was then stirred for 30 seconds at 2,000 rpm by using a rotation/revolution mixer (THINKY MIXER, ARE-310, manufactured by THINKY Corporation). Furthermore, 44.6 parts by mass of artificial graphite (CGB-20, manufactured by Nippon Graphite Industries, Ltd., non-volatile content 100%) as an active substance and 5.1 parts by mass of silicon (silicon monoxide, SILICON MONOOXIDE SiO 1.3C 5 μm, manufactured by Osaka Titanium Technologies Co., Ltd., non-volatile content 100%) were added, and the mixture was stirred for 150 seconds at 2,000 rpm by using the rotation/revolution mixer (THINKY MIXER, ARE-310, manufactured by THINKY Corporation). Subsequently, 1.6 parts by mass of SBR (TRD2001, manufactured by JSR Corporation) was added, and the mixture was stirred for 30 seconds at 2,000 rpm by using the rotation/revolution mixer (THINK Y MIXER, ARE-310, manufactured by THINKY Corporation) to obtain a standard negative electrode mixture composition. The non-volatile content of the standard negative electrode mixture composition was set to 50 mass %.

<2> Components

The details of the components used in the examples and comparative examples are shown below. MIRALON: Multi-layered CNT manufactured by HUNTSMAN Corporation CNT (A): CNT (A) synthesized by using the following synthesis method, multi-layered CNT JENOTUBE 10B: JENOTUBE 10B (multi-layered CNT manufactured by JEIO) NTF01: NTF01 (multi-layered CNT manufactured by Hamamatsu Carbonics Co., Ltd.)

Dispersant 1: A dispersant synthesized according to the method described below Dispersant 2: A dispersant prepared by the preparation method described below $Na_2CO_3$: Manufactured by FUJIFILM Wako Pure Chemical Corporation NaOH: Manufactured by Tokyo Chemical Industry Co., Ltd., purity >98.0%

CMC: Carboxymethyl cellulose #1190 (manufactured by Daicel FineChem Ltd.)

Styrene butadiene rubber: TRD2001 (manufactured by JSR Corporation)

HNBR: Therban3406 (hydrogenated nitrile rubber manufactured by ARLANXEO)

PVdF: Solef5130 (polyvinylidene fluoride resin manufactured by Solvay)

Polytetrafluoroethylene: Polyflon PTFE D-210C (manufactured by Daikin Industries, Ltd.)

Synthesis of CNT (A)

The synthesis method of CNT (A) is described below.

A catalyst consisting of iron nitrate was evaporated on a silicon wafer (substrate), and a catalyst layer consisting of a metal catalyst was formed on a surface of the substrate.

Subsequently, the catalyst-supporting silicon wafer was placed in the central part of a horizontal reaction tube with an internal volume of 10 L, which can be pressurized and can be heated by an external heater. While injecting a nitrogen gas, exhaust gas was discharged to replace the air in the reaction tube with the nitrogen gas, and the atmosphere in a horizontal reaction tube was set with an oxygen concentration of 1 volume % or less. Next, heating was performed by using an external heater until the center temperature in the horizontal reaction tube reached 680° C. After reaching 680° C., an acetylene gas was introduced into the reaction tube as a carbon source at a flow rate of 2 L per minute, and the contact reaction was carried out for 15 hours. After the reaction was completed, the gas in the reaction tube was replaced with a nitrogen gas, and the temperature of the reaction tube was cooled until the temperature became 100° C. or less before removal.

Accordingly, CNT (A) was obtained.

<Synthesis of Dispersant 1>

To a reaction vessel equipped with a thermometer, a condenser, and a stirrer, 137 parts of ion-exchanged water, 100 parts of acrylic acid, 0.8 parts of 3-mercapto-1,2-propanediol, and 0.5 parts of V-50 (manufactured by FUJIFILM Wako Pure Chemical Corporation) as a polymerization initiator were added. The mixture was heated under 70° C. and stirred for 300 minutes (5 hours) at a temperature of 70° C. When the conversion rate reached 90% or higher, the reaction was terminated by cooling. Subsequently, unreacted raw materials were reduced by performing a heated distillation process under reduced pressure to obtain an aqueous solution of the polymer. A four-neck separable flask was charged with 500 parts of methyl ethyl ketone and 500 parts of methanol, and the polymer aqueous solution was added dropwise over 1 hour while rotating with a disperser at 1,000 rpm. The generated white precipitate was collected by filtration and dried under reduced pressure to obtain Dispersant 1.

<Preparation of Solution of Dispersant 2>

To a plastic container with a capacity of 1000 cm$^3$, 475 parts by mass of NMP and 25 parts by mass of NaOH (manufactured by Tosoh Corporation, Tosoh Pearl) were added. By using a high shear mixer (L5M-A, manufactured by SILVERSON) equipped with a fine emulsifier screen, dispersion was performed at a speed of 9000 rpm until the entire mixture became uniform. Then, by using a filter funnel, the mixture was passed through a nylon filter with an opening of 150 μm to prepare a NaOH dispersion liquid. 780 parts by mass of NMP was charged into a reaction vessel equipped with a gas introduction tube, a thermometer, a condenser, and a stirrer was charged with, and replacement with a nitrogen gas was carried out. Subsequently, the interior of the reaction vessel was heated to 80° C., and 200 parts by mass of HNBR (Therban 3406) were added and stirred until the HNBR was completely dissolved. Thereafter, 20 parts by mass of the NaOH dispersion liquid were added, and stirring was performed while adding air. The reaction vessel was maintained at 80° C. for 12 hours while heating was performed to obtain a solution of Dispersant 2 (20.1 mass % as solid content concentration).

<4> CNT Dispersion Composition

Example 1-1

To a stainless steel container, 98.82 parts by mass of ion-exchanged water and 0.54 parts by mass of Dispersant 1 were added and stirred with a disperser until uniform. Subsequently, while stirring with the disperser, 0.6 parts by mass of MIRALON and 0.04 parts by mass of sodium carbonate were added, a standard square hole-type head was further installed to a disperser and a high shear mixer (L5M-A, manufactured by SILVERSON), and the mixture was stirred at a speed of 7.000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 25 passes to obtain Dispersion Composition 1.

Example 1-2

The carbon nanotubes were changed to CNT (A), and Dispersion Composition 2 was obtained by dispersing according to the same procedure as in Example 1.

Example 1-3

To a stainless steel container, 98.82 parts by mass of ion-exchanged water and 0.54 parts by mass of Dispersant 1 were added and stirred with a disperser until uniform. Subsequently, while stirring with the disperser, 0.60 parts by mass of MIRALON and 0.04 parts by mass of sodium carbonate were added, a standard square hole-type head was further installed to a disperser and a high shear mixer (L5M-A, manufactured by SILVERSON), and the mixture was stirred at a speed of 7,000 rpm until uniform. 80 g of the dispersed liquid and 120 g of zirconia beads (bead diameter 1 mm @) were prepared in a glass bottle (M-225, manufactured by Hakuyo Glass Co., Ltd.), and a dispersion process was performed for 5 hours using a paint conditioner manufactured by Red Devil. Then, the dispersed liquid separating the zirconia beads was supplied to a high-pressure homogenizer (Star Burst lab HJP-17007, manufactured by Sugino Machine) and subjected to a circulation-type dispersion process. The dispersion process was performed by using a single-nozzle chamber with a nozzle diameter of 0.25 mm at a pressure of 100 MPa for 20 passes to obtain Dispersion Composition 3.

Example 1-4

To a stainless steel container, 98.82 parts by mass of ion-exchanged water and 0.54 parts by mass of Dispersant 1 were added and stirred with a disperser until uniform. Subsequently, while stirring with the disperser, 0.60 parts by mass of MIRALON and 0.04 parts by mass of sodium carbonate were added, a standard square hole-type head was further installed to a disperser and a high shear mixer (L5M-A, manufactured by SILVERSON), and the mixture was stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 20 passes. Then, 80 g of the dispersed liquid and 120 g of zirconia beads (bead diameter 1 mm) were prepared in a glass bottle (M-225, manufactured by Hakuyo Glass Co., Ltd.), and a dispersion process was performed for 5 hours using a paint conditioner manufactured by Red Devil. After separating the zirconia beads, Dispersion Composition 4 was obtained.

Example 1-5

In a Labo Plastomill (manufactured by Toyo Seiki Seisaku-sho, Ltd.), 14.4 parts by mass of Dispersant 1, 16 parts by mass of MIRALON, and 69.6 parts by mass of ion-exchanged water were prepared and dispersed for 3 hours. The mixture was then transferred to a stainless steel container, and 2565.6 parts by mass of the ion-exchanged water and 1.07 parts by mass of sodium carbonate were added. A high shear mixer (L5M-A, manufactured by SILVERSON) was installed to a standard square hole-type head, and the mixture was further stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 25 passes to obtain Dispersion Composition 5.

Example 1-6

In a Labo Plastomill (manufactured by Toyo Seiki Seisaku-sho, Ltd.), 14.4 parts by mass of Dispersant 1, 16 parts by mass of MIRALON, and 69.6 parts by mass of ion-exchanged water were prepared and dispersed for 3 hours. The mixture was then transferred to a stainless steel container, and 2565.6 parts by mass of the ion-exchanged water and 1.07 parts by mass of sodium carbonate were added. A high shear mixer (L5M-A, manufactured by SILVERSON) was installed to a standard square hole-type head, and the mixture was further stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 20 passes. Then, 80 g of the dispersed liquid and 120 g of zirconia beads (bead diameter 1 mm @) were prepared in a glass bottle (M-225, manufactured by Hakuyo Glass Co., Ltd.), and a dispersion process was performed for 5 hours using a paint conditioner manufactured by Red Devil. After separating the zirconia beads, Dispersion Composition 6 was obtained.

Example 1-7

In a Labo Plastomill (manufactured by Toyo Seiki Seisaku-sho, Ltd.), 14.4 parts by mass of Dispersant 1, 16 parts by mass of MIRALON, and 69.6 parts by mass of ion-exchanged water were prepared and dispersed for 3 hours. The mixture was then transferred to a stainless steel container, and 2565.6 parts by mass of the ion-exchanged water and 1.07 parts by mass of sodium carbonate were added. A high shear mixer (L5M-A, manufactured by SILVERSON) was installed to a standard square hole-type head, and the mixture was further stirred at a speed of 7,000 rpm until uniform. Then, 80 g of the dispersed liquid and 120 g of zirconia beads (bead diameter 1 mm Φ) were prepared in a glass bottle (M-225, manufactured by Hakuyo Glass Co., Ltd.), and a dispersion process was performed for 5 hours using a paint conditioner manufactured by Red Devil. Afterwards, the zirconia beads were separated. The dispersed liquid was supplied a high-pressure homogenizer (Star Burst lab HJP-17007, manufactured by Sugino Machine) and subjected to a circulation-type dispersion process. The dispersion process was performed by using a single-nozzle chamber with a nozzle diameter of 0.25 mm at a pressure of 100 MPa for 20 passes to obtain Dispersion Composition 7.

Example 1-8

To a stainless steel container, 98.82 parts by mass of ion-exchanged water and 0.54 parts by mass of Dispersant 1 were added and stirred with a disperser until uniform. Subsequently, while stirring with the disperser, 0.6 parts by mass of MIRALON and 0.04 parts by mass of sodium carbonate were added, and a standard square hole-type head was installed to a disperser and a high shear mixer (L5M-A, manufactured by SILVERSON), and the mixture was further stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 40 passes to obtain Dispersion Composition 8.

Example 1-9

To a stainless steel container, 98.82 parts by mass of ion-exchanged water and 0.54 parts by mass of Dispersant 1 were added and stirred with a disperser until uniform. Subsequently, while stirring with the disperser, 0.6 parts by mass of MIRALON and 0.04 parts by mass of sodium carbonate were added, a standard square hole-type head was further installed to a disperser and a high shear mixer (L5M-A, manufactured by SILVERSON), and the mixture was stirred at a speed of 7.000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 20 passes to obtain Dispersion Composition 9.

Example 1-10

To a stainless steel container, 98.82 parts by mass of ion-exchanged water and 0.54 parts by mass of Dispersant 1 were added and stirred with a disperser until uniform. Subsequently, while stirring with the disperser, 0.6 parts by mass of MIRALON and 0.04 parts by mass of sodium carbonate were added, a standard square hole-type head was further installed to a disperser and a high shear mixer (L5M-A, manufactured by SILVERSON), and the mixture was stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 40 passes to obtain Dispersion Composition 10.

Example 1-11

To a stainless steel container, 98.82 parts by mass of ion-exchanged water and 0.54 parts by mass of Dispersant 1 were added and stirred with a disperser until uniform. Subsequently, while stirring with the disperser, 0.6 parts by mass of MIRALON and 0.04 parts by mass of sodium carbonate were added, a standard square hole-type head was further installed to a disperser and a high shear mixer (L5M-A, manufactured by SILVERSON), and the mixture was stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 15 passes to obtain Dispersion Composition 11.

Example 1-12

To a stainless steel container, 98.82 parts by mass of ion-exchanged water and 0.54 parts by mass of Dispersant 1 were added and stirred with a disperser until uniform. Subsequently, while stirring with the disperser, 0.6 parts by mass of MIRALON and 0.04 parts by mass of sodium carbonate were added, a standard square hole-type head was further installed to a disperser and a high shear mixer (L5M-A, manufactured by SILVERSON), and the mixture was stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 55 passes to obtain Dispersion Composition 12.

Comparative Example 1-1

The carbon nanotubes were changed to JENOTUBE 10B, and Comparative Dispersion Composition 1 was obtained by dispersing according to the same procedure as in Example 1. However, the material ratio was adjusted as follows: 2.5 parts by mass of JENOTUBE 10B, 96.3 parts by mass of ion-exchanged water, 1.0 part by mass of Dispersant 1, and 0.13 parts by mass of sodium carbonate.

Comparative Example 1-2

The carbon nanotubes were changed to NTF01, and Comparative Dispersion Composition 2 was obtained by dispersing according to the same procedure as in Example 1.

Comparative Example 1-3

To a stainless steel container, 98.82 parts by mass of ion-exchanged water and 0.54 parts by mass of Dispersant 1 were added and stirred with a disperser until uniform. Subsequently, while stirring with the disperser, 0.6 parts by mass of MIRALON and 0.04 parts by mass of sodium carbonate were added, a standard square hole-type head was further installed to a disperser and a high shear mixer (L5M-A, manufactured by SILVERSON), and the mixture was stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 5 passes to obtain Comparative Dispersion Composition 3.

Comparative Example 1-4

To a stainless steel container, 98.82 parts by mass of ion-exchanged water and 0.54 parts by mass of Dispersant 1 were added and stirred with a disperser until uniform. Subsequently, while stirring with the disperser, 0.6 parts by mass of MIRALON and 0.04 parts by mass of sodium carbonate were added, a standard square hole-type head was further installed to a disperser and a high shear mixer (L5M-A, manufactured by SILVERSON), and the mixture was stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 80 passes to obtain Comparative Dispersion Composition 4.

Example 1-101

96.40 parts by mass of N-methyl-2-pyrrolidone (NMP), 3.0 parts by mass of a Dispersant 2 solution (0.60 parts by mass of HNBR, 0.03 parts by mass of NaOH, and 2.37 parts by mass of NMP) were added to a stainless steel container, and the mixture was stirred until uniform. Subsequently, while stirring with the disperser, 0.60 parts by mass of MIRALON were added, a standard square hole-type head was further installed to a disperser and a high shear mixer (L5M-A, manufactured by SILVERSON), and the mixture was stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 25 passes to obtain Dispersion Composition 101.

Example 1-102

96.40 parts by mass of N-methyl-2-pyrrolidone (NMP) and 3 parts by mass of a Dispersant 2 solution to a stainless container, and the mixture was stirred by a disperser until uniform. Subsequently, while stirring with the disperser, 0.60 parts by mass of MIRALON were added, a standard square hole-type head was further installed to a disperser and a high shear mixer (L5M-A, manufactured by SILVERSON), and the mixture was stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 25 passes to obtain Dispersion Composition 102.

Example 1-103

96.40 parts by mass of N-methyl-2-pyrrolidone (NMP) and 3 parts by mass of a Dispersant 2 solution to a stainless container, and the mixture was stirred by a disperser until uniform. Subsequently, while stirring with the disperser, 0.60 parts by mass of MIRALON were added, a standard square hole-type head was further installed to a disperser and a high shear mixer (L5M-A, manufactured by SILVERSON), and the mixture was stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 15 passes to obtain Dispersion Composition 103.

Example 1-104

96.40 parts by mass of N-methyl-2-pyrrolidone (NMP) and 3 parts by mass of a Dispersant 2 solution to a stainless container, and the mixture was stirred by a disperser until uniform. Subsequently, while stirring with the disperser, 0.60 parts by mass of MIRALON were added, a standard square hole-type head was further installed to a disperser and a high shear mixer (L5M-A, manufactured by SILVERSON), and the mixture was stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 55 passes to obtain Dispersion Composition 104.

Comparative Example 1-101

96.40 parts by mass of N-methyl-2-pyrrolidone (NMP), 3.0 parts by mass of a Dispersant 2 solution (0.60 parts by mass of HNBR. 0.03 parts by mass of NaOH, and 2.37 parts by mass of NMP) were added to a stainless steel container, and the mixture was stirred until uniform. Subsequently, while stirring with the disperser, 0.60 parts by mass of MIRALON were added, a standard square hole-type head was further installed to a disperser and a high shear mixer (L5M-A, manufactured by SILVERSON), and the mixture was stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 5 passes to obtain Comparative Dispersion Composition 101.

Comparative Example 1-102

96.40 parts by mass of N-methyl-2-pyrrolidone (NMP) and 3 parts by mass of a Dispersant 2 solution to a stainless container, and the mixture was stirred by a disperser until uniform. Subsequently, while stirring with the disperser, 0.60 parts by mass of MIRALON were added, a standard square hole-type head was further installed to a disperser and a high shear mixer (L5M-A, manufactured by SILVERSON), and the mixture was stirred at a speed of 7,000 rpm until uniform. The dispersed liquid was supplied from the stainless steel container to a high-pressure homogenizer (Star Burst lab HJP-17007, manufactured by Sugino Machine) through piping and subjected to a circulation-type dispersion process. The dispersion process was performed by using a single-nozzle chamber with a nozzle diameter of 0.25 mm at a pressure of 100 MPa for 80 passes to obtain Comparative Dispersion Composition 102.

<5> Preparation of CNT Resin Composition and Mixture Slurry
<Mixture Slurry 1 for Negative Electrode>

5.7 parts by mass of Dispersion Composition 1, 11.4 parts by mass of an aqueous solution in which 2 mass % of carboxymethyl cellulose (manufactured by Daicel Fine Chem Ltd., #1190, referred to as CMC in the table (hereinafter the same)) was dissolved, and 10.7 parts by mass of ion-exchanged water were measured in a plastic container with a capacity of 150 cm$^3$ was measured. Subsequently, stirring was performed for 30 seconds at 2000 rpm by using a rotation/revolution mixer (THINKY MIXER, ARE-310, manufactured by THINKY Corporation). Subsequently, 2.2 parts by mass of silicon monoxide (manufactured by Osaka Titanium Technologies Co., Ltd., SILICON MONOXIDE, SiO1.3C 5 μm) were added and stirred for 5 minutes at 2000 rpm by using the rotation/revolution mixer. Furthermore, 19.9 parts by mass of artificial graphite (manufactured by Nippon Graphite Industries, Ltd., CGB-20) were added and stirred for 10 minutes at 2000 rpm by using the rotation/revolution mixer. After that, 0.7 parts by mass of styrene butadiene rubber (manufactured by JSR Corporation, TRD2001, with 48% of non-volatile contents, referred to as SBR in the table (the same applies in the following)) were added and stirred for 30 seconds at 2000 rpm by using the rotation/revolution mixer to obtain Mixture Slurry 1 for negative electrode with a non-volatile content mass % as shown in Table 2.

<Mixture Slurries 2 to 7 for Negative Electrode>

Mixture Slurries 2 to 7 for negative electrode were respectively obtained by changing Dispersion Composition 1 to Dispersion Compositions 2 to 7, respectively, in the same procedure as for Mixture Slurry 1 for negative electrode.

<Comparative Mixture Slurry 1 for Negative Electrode>

Comparative Mixture Slurry 1 for negative electrode was obtained by following the same procedure as for Mixture Slurry 1 for negative electrodes, with changes in the material ratios as follows: 4.5 parts by mass of Comparative Dispersion Composition 1, 11.3 parts by mass of an aqueous solution in which 2 mass % of carboxymethyl cellulose (manufactured by Daicel Fine Chem Ltd., #1190) were dissolved, 11.8 parts by mass of ion-exchanged water, 2.2 parts by mass of silicon monoxide (manufactured by Osaka Titanium Technologies Co., Ltd., SILICON MONOXIDE, SiO 1.3C 5 μm), 19.6 parts by mass of artificial graphite (manufactured by Nippon Graphite Industries, Ltd., CGB-20), and 0.7 parts by mass of styrene butadiene rubber (manufactured by JSR Corporation, TRD2001).

<Comparative Mixture Slurry 2 for Negative Electrode>

Comparative Mixture Slurry 2 for negative electrode was obtained by following the same procedure as for Mixture Slurry 1 for negative electrodes, with changes in the material ratios as follows: 11.4 parts by mass of Comparative Dispersion Composition 2, 11.4 parts by mass of an aqueous solution in which 2 mass % of carboxymethyl cellulose (manufactured by Daicel Fine Chem Ltd., #1190) were dissolved, 11.8 parts by mass of ion-exchanged water, 2.2 parts by mass of silicon monoxide (manufactured by Osaka Titanium Technologies Co., Ltd., SILICON MONOXIDE, SiO 1.3C 5 μm), 19.9 parts by mass of artificial graphite (manufactured by Nippon Graphite Industries, Ltd., CGB-20), and 0.7 parts by mass of styrene butadiene rubber (manufactured by JSR Corporation, TRD2001).

<Mixture Slurries 8 to 12 for Negative Electrode>

Mixture Slurries 8 to 12 for negative electrode were respectively obtained by changing Dispersion Composition 1 to Dispersion Compositions 8 to 12, respectively, in the same procedure as for Mixture Slurry 1 for negative electrode.

<Comparative Mixture Slurries 3 and 4 for Negative Electrode>

Mixture Slurries 3 to 4 for negative electrode were respectively obtained by changing Dispersion Composition 1 to Dispersion Compositions 3 to 4, respectively, in the same procedure as for Mixture Slurry 1 for negative electrode.

<Mixture Slurry 1 for Positive Electrode>

In a plastic container with a capacity of 150 cm$^3$, 8.2 parts by mass of Dispersion Composition 1, 0.3 parts by mass of carboxymethyl cellulose (manufactured by Daicel Fine Chem Ltd., #1190), and 9.3 parts by mass of ion-exchanged water were measured and stirred for 30 seconds at 2,000 rpm by using a rotation/revolution mixer (THINKY MIXER, ARE-310, manufactured by THINKY Corporation). Subsequently, 32.0 parts by mass of LFP (LFP-400 manufactured by BASF, non-volatile content 100%) were added as a positive electrode active substance, and the mixture was stirred for 5 minutes by using the rotation/revolution mixer (THINKY MIXER, ARE-310, manufactured by THINKY Corporation). Furthermore, 0.8 parts by mass of polytetrafluoroethylene (manufactured by Daikin Industries, Ltd., Polyflon PTFE D-210C, non-volatile content 60%, referred to as PTFE in the table (the same applies hereafter)) were added, a rotation/revolution mixer (THINK Y MIXER, ARE-310, manufactured by THINKY Corporation) was used to stir at 2,000 rpm for 30 seconds, thereby obtaining Mixture Slurry 1 for positive electrode with the non-volatile content mass % as described in Table 3.

(Mixture Slurries 2 to 7 for Positive Electrode)

Mixture Slurries 2 to 7 for positive electrode were obtained by changing to Dispersion Compositions 2 to 7 in the same procedure as for Mixture Slurry 1 for positive electrode.

<Comparative Mixture Slurry 1 for Positive Electrode>

Comparative Mixture Slurry 1 for positive electrode was obtained by following the same procedure as for Mixture Slurry 1 for positive electrode, with changes in the material ratios as follows: 6.5 parts by mass of Comparative Dispersion Composition 1, 0.3 parts by mass of carboxymethyl cellulose (manufactured by Daicel Fine Chem Ltd., #1190), 11.0 parts by mass of ion-exchanged water, 31.4 parts by mass of LFP (LFP-400 manufactured by BASF, non-volatile content 100%), and 0.8 parts by mass of polytetrafluoroethylene (manufactured by Daikin Industries, Ltd., Polyflon PTFE D-210C, non-volatile content 60%).

<Comparative Mixture Slurry 2 for Positive Electrode>

Comparative Mixture Slurry 2 for positive electrode was obtained by following the same procedure as for Mixture Slurry 1 for positive electrode, with changes in the material ratios as follows: 6.5 parts by mass of Comparative Dispersion Composition 2, 0.3 parts by mass of carboxymethyl cellulose (manufactured by Daicel Fine Chem Ltd., #1190), 1.1 parts by mass of ion-exchanged water, 31.9 parts by mass of LFP (LFP-400 manufactured by BASF, non-volatile content 100%), and 0.8 parts by mass of polytetrafluoroethylene (manufactured by Daikin Industries, Ltd., Polyflon PTFE D-210C, non-volatile content 60%).

<Mixture Slurry 101 for Positive Electrode>

In a plastic container with a capacity of 150 cm3, 31.1 parts by mass of an NMP solution in which 8 mass % of PVdF (polyvinylidene fluoride, manufactured by Solvay, Solef #5130) was dissolved and 4 parts by mass of NMP were measured. Then, 24.9 parts by mass of the dispersion composition 101 were added, and the mixture was stirred for 30 seconds at 2000 rpm by using a rotation/revolution mixer (AWATORI RENTARO, ARE-310). Subsequently, 96.7 parts by mass of a positive electrode active substance NCM1 were added, and the mixture was stirred for 2.5 minutes at 2000 rpm using a rotation/revolution mixer (AWATORI RENTARO, ARE-310) to obtain Mixture Slurry 101 for positive electrode.

(Mixture Slurries 102 to 104 for positive electrode, Comparative Mixture Slurries 101 to 102 for positive electrode)

Mixture Slurries 102 to 104 for positive electrode and Comparative Mixture Slurries 101 to 102 for positive electrode were obtained by changing Dispersion Composition 101 to Dispersion Compositions 102 to 104 and Comparative Dispersion Compositions 101 to 102, respectively, following the same procedure as for Mixture Slurry 101 for positive electrode.

<6> Manufacture and Evaluation of Electrode Film

<6-1> Electrode Film for Negative Electrode

Example 2-1: Negative Electrode 1

Mixture Slurry 1 for negative electrode was coated on a copper foil with a thickness of 20 μm by using an applicator, and then the coating film was dried in an electric oven at 120° C.±5° C. for 25 minutes to prepare an electrode film. Subsequently, the electrode film was subjected to a rolling process by using a roll press (3t hydraulic roll press manufactured by Thank-metal) to obtain a negative electrode (Negative Electrode 1). The weight per unit area of the composite layer was 10 mg/cm$^2$, and the density of the composite layer after the rolling process was 1.6 g/cm$^3$.

Example 2-2 to 2-12: Negative Electrode 2 to 12

Negative Electrodes 2 to 12 were respectively obtained by changing to Mixture Slurries 2 to 12 for negative electrode, following the same procedure as for Negative Electrode 1.

Comparative Example 2-1 to 2-4: Comparative Negative Electrode 1 to 4

Comparative Negative Electrodes 1 to 4 were respectively obtained by changing Mixture Slurry 1 for negative electrode to Comparative Mixture Slurries 1 to 4 for negative electrode, following the same procedure as the procedure for Negative Electrode 1.

<6-2> Electrode Film for Positive Electrode

Example 3-1: Positive Electrode 1

Mixture Slurry 1 for positive electrode was coated on an aluminum foil with a thickness of 20 μm by using an applicator, and then the coating film was dried in an electric oven at 120° C.±5° C. for 25 minutes to prepare an electrode film. Subsequently, the electrode film was subjected to a rolling process by using a roll press (3t hydraulic roll press manufactured by Thank-metal) to obtain a positive electrode (Positive Electrode 1). The weight per unit area of the composite layer was 20 mg/cm$^2$, and the density of the composite layer after the rolling process was 2.1 g/cm$^3$.

(Examples 3-2 to 3-7, Comparative Examples 3-1 to 3-2: Positive Electrodes 2 to 7. Comparative Positive Electrodes 1 to 2) Positive Electrodes 2 to 7 and Comparative Positive Electrodes 1 to 2 were respectively obtained by changing Mixture Slurry 1 for positive electrode to Mixture Slurries 2 to 7 for positive electrode and Comparative Mixture Slurries 1 to 2 for positive electrode, following the same procedure as the procedure for Positive Electrode 1.

(Examples 3-101 to 3-104, Comparative Examples 3-101 to 3-102: Positive Electrodes 101 to 104, Comparative Positive Electrodes 101 to 102) Positive Electrodes 101 to 104 and Comparative Positive Electrodes 101 to 102 were respectively obtained by changing Mixture Slurry 1 for positive electrode to Mixture Slurries 101 to 104 for positive electrode and Comparative Mixture Slurries 101 to 102 for positive electrode, following the same procedure as the procedure for Positive Electrode 101.

<7>Laminate-Type Lithium Ion Secondary Battery (Example 4-1: Battery 1 for Negative Electrode Evaluation)

The negative electrode 1 and the standard positive electrode were punched out to 50 mm×45 mm and 45 mm×40 mm, respectively. The punched-out negative electrode and standard positive electrode, along with a separator (porous polypropylene film) inserted therebetween, were inserted into in an aluminum laminate bag and dried in an electric oven at 70° C. for 1 hour. Subsequently, a non-aqueous electrolyte was prepared in a glove box filled with argon gas. Specifically, first, a mixed solvent was prepared by mixing ethylene carbonate, ethyl methyl carbonate, and dimethyl carbonate at a ratio of 1:1:1 (volume ratio). Next, for 100 parts by mass of the mixed solvent, 1 part by mass each of vinylene carbonate (VC) and fluoroethylene carbonate (FEC) were added as additives, and $LiPF_6$ was further dissolved at a concentration of 1M to obtain a non-aqueous electrolyte. Then, 2 mL of the non-aqueous electrolyte was injected into the aluminum laminate bag. The aluminum laminate bag was then sealed to create a laminate-type lithium ion secondary battery (Battery 1 for negative electrode evaluation).

Examples 4-2 to 4-12, and Comparative Examples 4-1 to 4-4

Laminate-type lithium ion secondary batteries (batteries for negative electrode evaluation) 2 to 12 and comparative batteries 1 to 4 for negative electrode evaluation were respectively manufactured by changing Negative Electrode 1 in Example 4-1 to Negative Electrodes 2 to 12 and Comparative Negative Electrodes 1 to 4, while following the same method as in Example 4-1 for all other aspects.

(Examples 5-1 to 5-7, 5-101 to 5-104 and Comparative Examples 5-1 to 5-2, 5-101 to 5-102) The manufacturing of laminate-type lithium ion secondary batteries using positive electrodes and standard negative electrodes followed the same method as in Example 4-1, except that the negative electrode in Example 4-1 was set as a standard negative electrode, and the positive electrode was changed to Positive Electrodes 1 to 7, Positive Electrodes 101 to 104, Comparative Positive Electrodes 1 to 2, and Comparative Positive Electrodes 101 to 102, respectively, and Batteries 1 to 7 for positive electrode evaluation, Comparative Batteries 101 to 104 for positive electrode evaluation, and Comparative Batteries 101 to 102 for positive electrode evaluation were obtained.

The rate properties and cycle properties of the laminate-type lithium ion secondary batteries were evaluated. The evaluation criteria are shown below. The evaluation results are presented in Table 4 and Table 5.

(Evaluation Method for Rate Properties of Secondary Batteries)

The secondary batteries for negative electrode evaluation and the batteries for positive electrode evaluation were placed in a constant temperature room at 25° C., and charge-discharge measurements were performed by using a charge-discharge device (SM-8, manufactured by Hokuto Denko Corporation). After performing constant-current constant-voltage charging (cut-off current: 1 mA (0.02C)) with a charging current of 10 mA (0.2C) at a charge cut-off voltage of 4.3 V, constant-current discharging was performed with a discharge current of 10 mA (0.2C) at a discharge cut-off voltage of 3 V. The operation was repeated 3 times, and then constant-current constant-voltage charging (cut-off current (1 mA, 0.02C)) was performed with a charging current of 10 mA (0.2C) at a charge cut-off voltage of 4.2 V. Constant-current discharging was then performed, with discharge currents of 0.2C and 3C until the discharge cut-off voltage of 3.0 V was reached, and the respective discharge capacities were determined. The rate properties can be expressed by the ratio between the discharge capacity of 0.2C and the discharge capacity of 3C. as shown in Formula 1 as follows.

Rate properties=(discharge capacity of 3C/discharge capacity of 0.2C for the third time)×100(%)  (Formula 1)

<Evaluation Criteria>

⊚: Rate properties 80% or higher (excellent)

○: Rate properties 70% or higher and less than 80% (good)

Δ: Rate properties 60% or higher and less than 70% (poor)

(Evaluation Method for Cycle Properties of Secondary Batteries)

The secondary batteries for negative electrode evaluation and the batteries for positive electrode evaluation were placed in a constant temperature room at 25° C., and charge-discharge measurements were performed by using a charge-discharge device (SM-8, manufactured by Hokuto Denko Corporation). After performing constant-current constant-voltage charging (cut-off current: 2.5 mA (0.05C)) with a charging current of 25 mA (0.5 C) at a charge cut-off voltage of 4.3 V, constant-current discharging was performed with a discharge current of 10 mA (0.2C) at a discharge cut-off voltage of 3 V. The operation was repeated 200 times. The cycle properties can be expressed by the ratio between the discharge capacity of 0.5 C at the $3^{rd}$ cycle and the discharge capacity of 0.5 C at the $200^{th}$ cycle at 25° C., as shown in Formula 2 as follows.

Cycle properties=0.5C discharge capacity at the $200^{th}$ cycle/0.5C discharge capacity at the $3^{rd}$ cycle ×100(%)

<Evaluation Criteria>

⊚⊚: 90% or higher (excellent)

⊚: 85% or higher (very good)

○: 80% or higher and less than 85% (good)

x: Less than 80% (poor)

TABLE 1

| | Dispersion composition | CNT Type | CNT Content rate (%) | Dispersant Type | Dispersant Content rate (%) | Basic compound Type | Basic compound Content rate (%) | Water Content rate (%) |
|---|---|---|---|---|---|---|---|---|
| Example 1-1 | Dispersion Composition 1 | MIRALON made by HUNTSMAN | 0.60 | Dispersant 1 | 0.54 | $Na_2CO_3$ | 0.04 | 98.82 |
| Example 1-2 | Dispersion Composition 2 | CNT (A) | 0.60 | Dispersant 1 | 0.54 | $Na_2CO_3$ | 0.04 | 98.82 |
| Example 1-3 | Dispersion Composition 3 | MIRALON made by HUNTSMAN | 0.60 | Dispersant 1 | 0.54 | $Na_2CO_3$ | 0.04 | 98.82 |
| Example 1-4 | Dispersion Composition 4 | MIRALON made by HUNTSMAN | 0.60 | Dispersant 1 | 0.54 | $Na_2CO_3$ | 0.04 | 98.82 |
| Example 1-5 | Dispersion Composition 5 | MIRALON made by HUNTSMAN | 0.60 | Dispersant 1 | 0.54 | $Na_2CO_3$ | 0.04 | 98.82 |
| Example 1-6 | Dispersion Composition 6 | MIRALON made by HUNTSMAN | 0.60 | Dispersant 1 | 0.54 | $Na_2CO_3$ | 0.04 | 98.82 |
| Example 1-7 | Dispersion Composition 7 | MIRALON made by HUNTSMAN | 0.60 | Dispersant 1 | 0.54 | $Na_2CO_3$ | 0.04 | 98.82 |
| Example 1-8 | Dispersion Composition 8 | MIRALON made by HUNTSMAN | 0.60 | Dispersant 1 | 0.54 | $Na_2CO_3$ | 0.04 | 98.82 |
| Example 1-9 | Dispersion Composition 9 | MIRALON made by HUNTSMAN | 0.60 | Dispersant 1 | 0.54 | $Na_2CO_3$ | 0.04 | 98.82 |
| Example 1-10 | Dispersion Composition 10 | MIRALON made by HUNTSMAN | 0.60 | Dispersant 1 | 0.54 | $Na_2CO_3$ | 0.04 | 98.82 |
| Example 1-11 | Dispersion Composition 11 | MIRALON made by HUNTSMAN | 0.60 | Dispersant 1 | 0.54 | $Na_2CO_3$ | 0.04 | 98.82 |
| Example 1-12 | Dispersion Composition 12 | MIRALON made by HUNTSMAN | 0.60 | Dispersant 1 | 0.54 | $Na_2CO_3$ | 0.04 | 98.82 |
| Comparative Example 1-1 | Comparative Dispersion Composition 1 | JENOTUBE 10B | 2.50 | Dispersant 1 | 1.00 | $Na_2CO_3$ | 0.13 | 96.37 |
| Comparative Example 1-2 | Comparative Dispersion Composition 2 | NTF01 manufactured by Hamamatsu Carbonics | 0.60 | Dispersant 1 | 0.54 | $Na_2CO_3$ | 0.04 | 98.82 |
| Comparative Example 1-3 | Comparative Dispersion Composition 3 | MIRALON made by HUNTSMAN | 0.60 | Dispersant 1 | 0.54 | $Na_2CO_3$ | 0.04 | 98.82 |
| Comparative Example 1-4 | Comparative Dispersion Composition 4 | MIRALON made by HUNTSMAN | 0.60 | Dispersant 1 | 0.54 | $Na_2CO_3$ | 0.04 | 98.82 |

| | Dispersant amount/ CNT 100 parts by mass | Basic compound Amount/ Dispersant 100 parts by mass | Linearity index (%) | Average outer diameter (nm) | BET specific surface area of substance obtained by drying dispersion composition and manufactured into powder relative to mass of CNT ($m^2/g$) | GD ratio of coating film of dispersion composition | Complex elastic modulus (Pa) | Phase angle (°) |
|---|---|---|---|---|---|---|---|---|
| Example 1-1 | 90 | 7 | 65% | 23 | 98 | 1.9 | 69 | 14 |
| Example 1-2 | 90 | 7 | 46% | 25 | 119 | 1.1 | 39 | 16 |
| Example 1-3 | 90 | 7 | 64% | 21 | 101 | 1.8 | 65 | 14 |
| Example 1-4 | 90 | 7 | 61% | 22 | 102 | 1.8 | 78 | 13 |
| Example 1-5 | 90 | 7 | 61% | 22 | 108 | 1.9 | 41 | 16 |
| Example 1-6 | 90 | 7 | 62% | 21 | 105 | 1.8 | 35 | 18 |
| Example 1-7 | 90 | 7 | 60% | 22 | 100 | 1.8 | 34 | 18 |
| Example 1-8 | 90 | 7 | 65% | 23 | 121 | 1 | 30 | 21 |
| Example 1-9 | 90 | 7 | 53% | 27 | 99 | 3.3 | 79 | 12 |
| Example 1-10 | 90 | 7 | 77% | 20 | 106 | 1.7 | 47 | 22 |
| Example 1-11 | 90 | 7 | 48% | 38 | 104 | 5.4 | 132 | 8 |
| Example 1-12 | 90 | 7 | 83% | 18 | 101 | 1.2 | 30 | 31 |
| Comparative Example 1-1 | 40 | 13 | 0% | 30 | 128 | 0.9 | 19 | 22 |
| Comparative Example 1-2 | 90 | 7 | 23% | 55 | 32 | 2.5 | 10 | 32 |
| Comparative Example 1-3 | 90 | 7 | 32% | 44 | 97 | 7.3 | 259 | 7 |
| Comparative Example 1-4 | 90 | 7 | 94% | 16 | 105 | 1 | 19 | 36 |

TABLE 1-continued

| | Dispersion composition | CNT Type | CNT Content rate (%) | Dispersant Type | Dispersant Content rate (%) | Basic compound (included in Dispersant 2) Type | Content rate (relative to entirety of composition) | NMP Content rate (%) |
|---|---|---|---|---|---|---|---|---|
| Example 1-101 | Dispersion Composition 101 | MIRALON made by HUNTSMAN | 0.60 | Dispersant 2 | 0.63 | NaOH | 0.03 | 98.77 |
| Example 1-102 | Dispersion Composition 102 | CNT (A) | 0.60 | Dispersant 2 | 0.63 | NaOH | 0.03 | 98.77 |
| Example 1-103 | Dispersion Composition 103 | MIRALON made by HUNTSMAN | 0.60 | Dispersant 2 | 0.63 | NaOH | 0.03 | 98.77 |
| Example 1-104 | Dispersion Composition 104 | MIRALON made by HUNTSMAN | 0.60 | Dispersant 2 | 0.63 | NaOH | 0.03 | 98.77 |
| Comparative Example 1-101 | Comparative Dispersion Composition 101 | MIRALON made by HUNTSMAN | 0.60 | Dispersant 2 | 0.63 | NaOH | 0.03 | 98.77 |
| Comparative Example 1-102 | Comparative Dispersion Composition 102 | MIRALON made by HUNTSMAN | 0.60 | Dispersant 2 | 0.63 | NaOH | 0.03 | 98.77 |

| | Dispersant amount/ CNT 100 parts by mass | Basic compound Amount/ Dispersant 100 parts by mass | Linearity Index (%) | Average outer diameter (nm) | BET specific surface area of substance obtained by drying dispersion composition and manufactured into powder relative to mass of CNT ($m^2/g$) | GD ratio of coating film of dispersion composition | Complex elastic modulus (Pa) | Phase angle (°) |
|---|---|---|---|---|---|---|---|---|
| Example 1-101 | 90 | 7 | 68% | 21 | 100 | 1.9 | 66 | 16 |
| Example 1-102 | 90 | 7 | 57% | 27 | 123 | 1.2 | 45 | 14 |
| Example 1-103 | 90 | 7 | 44% | 38 | 104 | 6.1 | 126 | 9 |
| Example 1-104 | 90 | 7 | 81% | 18 | 109 | 1.2 | 35 | 34 |
| Comparative Example 1-101 | 90 | 7 | 36% | 49 | 103 | 7.5 | 191 | 7 |
| Comparative Example 1-102 | 90 | 7 | 93% | 16 | 110 | 1.0 | 13 | 38 |

TABLE 2

| | Negative electrode | Mixture slurry for negative electrode | Dispersion composition | Negative active substance Artificial graphite non-volatile component Mass % | Negative active substance Silicon monoxide non-volatile component Mass % |
|---|---|---|---|---|---|
| Example 2-1 | Negative Electrode 1 | Mixture slurry 1 for negative electrode | Dispersion Composition 1 | 87.5 | 9.7 |
| Example 2-2 | Negative Electrode 2 | Mixture Slurry 2 for negative electrode | Dispersion Composition 2 | 87.5 | 9.7 |
| Example 2-3 | Negative Electrode 3 | Mixture Slurry 3 for negative electrode | Dispersion Composition 3 | 87.5 | 9.7 |
| Example 2-4 | Negative Electrode 4 | Mixture Slurry 4 for negative electrode | Dispersion Composition 4 | 87.5 | 9.7 |
| Example 2-5 | Negative Electrode 5 | Mixture Slurry 5 for negative electrode | Dispersion Composition 5 | 87.5 | 9.7 |
| Example 2-6 | Negative Electrode 6 | Mixture Slurry 6 for negative electrode | Dispersion Composition 6 | 87.5 | 9.7 |
| Example 2-7 | Negative Electrode 7 | Mixture Slurry 7 for negative electrode | Dispersion Composition 7 | 87.5 | 9.7 |
| Example 2-8 | Negative Electrode 8 | Mixture Slurry 8 for negative electrode | Dispersion Composition 8 | 87.5 | 9.7 |
| Example 2-9 | Negative Electrode 9 | Mixture Slurry 9 for negative electrode | Dispersion Composition 9 | 87.5 | 9.7 |

TABLE 2-continued

| | | | | | |
|---|---|---|---|---|---|
| Example 2-10 | Negative Electrode 10 | Mixture Slurry 10 for negative electrode | Dispersion Composition 10 | 87.5 | 9.7 |
| Example 2-11 | Negative Electrode 11 | Mixture Slurry 11 for negative electrode | Dispersion Composition 11 | 87.5 | 9.7 |
| Example 2-12 | Negative Electrode 12 | Mixture Slurry 12 for negative electrode | Dispersion Composition 12 | 87.5 | 9.7 |
| Comparative Example 2-1 | Comparative Negative Electrode 1 | Mixture slurry 1 for comparative negative electrode | Comparative Dispersion Composition 1 | 87.1 | 9.7 |
| Comparative Example 2-2 | Comparative Negative Electrode 2 | Mixture slurry 2 for comparative negative electrode | Comparative Dispersion Composition 2 | 87.2 | 9.7 |
| Comparative Example 2-3 | Comparative Negative Electrode 3 | Mixture slurry 3 for comparative negative electrode | Comparative Dispersion Composition 3 | 87.5 | 9.7 |
| Comparative Example 2-4 | Comparative Negative Electrode 4 | Mixture slurry 4 for comparative negative electrode | Comparative Dispersion Composition 4 | 87.5 | 9.7 |

| | CNT | | Dispersant | CMC | SBR | Composite material |
|---|---|---|---|---|---|---|
| | Type | non-volatile component Mass % | non-volatile component Mass % | non-volatile component Mass % | non-volatile component Mass % | non-volatile component Mass % |
| Example 2-1 | MIRALON manufactured by NANOCOMP | 0.15 | 0.14 | 1.0 | 1.5 | 45% |
| Example 2-2 | CNT (A) | 0.15 | 0.14 | 1.0 | 1.5 | 45% |
| Example 2-3 | MIRALON manufactured by NANOCOMP | 0.15 | 0.14 | 1.0 | 1.5 | 45% |
| Example 2-4 | MIRALON manufactured by NANOCOMP | 0.15 | 0.14 | 1.0 | 1.5 | 45% |
| Example 2-5 | MIRALON manufactured by NANOCOMP | 0.15 | 0.14 | 1.0 | 1.5 | 45% |
| Example 2-6 | MIRALON manufactured by NANOCOMP | 0.15 | 0.14 | 1.0 | 1.5 | 45% |
| Example 2-7 | MIRALON manufactured by NANOCOMP | 0.15 | 0.14 | 1.0 | 1.5 | 45% |
| Example 2-8 | MIRALON manufactured by NANOCOMP | 0.15 | 0.14 | 1.0 | 1.5 | 45% |
| Example 2-9 | MIRALON manufactured by NANOCOMP | 0.15 | 0.14 | 1.0 | 1.5 | 45% |
| Example 2-10 | MIRALON manufactured by NANOCOMP | 0.15 | 0.14 | 1.0 | 1.5 | 45% |
| Example 2-11 | MIRALON manufactured by NANOCOMP | 0.15 | 0.14 | 1.0 | 1.5 | 45% |
| Example 2-12 | MIRALON manufactured by NANOCOMP | 0.15 | 0.14 | 1.0 | 1.5 | 45% |
| Comparative Example 2-1 | JENOTUBE 10B | 0.50 | 0.20 | 1.0 | 1.5 | 45% |
| Comparative Example 2-2 | NTF01 manufactured by Hamamatsu Carbonics | 0.30 | 0.27 | 1.0 | 1.5 | 45% |
| Comparative Example 2-3 | MIRALON manufactured by NANOCOMP | 0.15 | 0.14 | 1.0 | 1.5 | 45% |
| Comparative Example 2-4 | MIRALON manufactured by NANOCOMP | 0.15 | 0.14 | 1.0 | 1.5 | 45% |

TABLE 3

| | Positive electrode | Mixture slurry for positive electrode | Dispersion composition | Positive active substance LFP non-volatile component Mass % | CNT Type |
|---|---|---|---|---|---|
| Example 3-1 | Positive Electrode 1 | Mixture Slurry 1 for positive electrode | Dispersion Composition 1 | 97.2 | MIRALON manufactured by NANOCOMP |
| Example 3-2 | Positive Electrode 2 | Mixture Slurry 2 for positive electrode | Dispersion Composition 2 | 97.2 | CNT (A) |
| Example 3-3 | Positive Electrode 3 | Mixture Slurry 3 for positive electrode | Dispersion Composition 3 | 97.2 | MIRALON manufactured by NANOCOMP |
| Example 3-4 | Positive Electrode 4 | Mixture Slurry 4 for positive electrode | Dispersion Composition 4 | 97.2 | MIRALON manufactured by NANOCOMP |

TABLE 3-continued

| | | | | | |
|---|---|---|---|---|---|
| Example 3-5 | Positive Electrode 5 | Mixture Slurry 5 for positive electrode | Dispersion Composition 5 | 97.2 | MIRALON manufactured by NANOCOMP |
| Example 3-6 | Positive Electrode 6 | Mixture Slurry 6 for positive electrode | Dispersion Composition 6 | 97.2 | MIRALON manufactured by NANOCOMP |
| Example 3-7 | Positive Electrode 7 | Mixture Slurry 7 for positive electrode | Dispersion Composition 7 | 97.2 | MIRALON manufactured by NANOCOMP |
| Comparative Example 3-1 | Comparative positive electrode 1 | Comparative Mixture Slurry 1 for positive electrode | Comparative Dispersion Composition 1 | 96.8 | JENOTUBE 10B |
| Comparative Example 3-2 | Comparative positive electrode 2 | Comparative Mixture Slurry 2 for positive electrode | Comparative Dispersion Composition 2 | 96.9 | NTF01 manufactured by Hamamatsu Carbonics |
| Example 3-101 | Positive Electrode 101 | Mixture Slurry 101 for positive electrode | Dispersion Composition 101 | 97.2 | MIRALON manufactured by NANOCOMP |
| Example 3-102 | Positive Electrode 102 | Mixture Slurry 102 for positive electrode | Dispersion Composition 102 | 97.2 | CNT (A) |
| Example 3-103 | Positive Electrode 103 | Mixture Slurry 103 for positive electrode | Dispersion Composition 103 | 97.2 | MIRALON manufactured by NANOCOMP |
| Example 3-104 | Positive Electrode 104 | Mixture Slurry 104 for positive electrode | Dispersion Composition 104 | 97.2 | MIRALON manufactured by NANOCOMP |
| Comparative Example 3-101 | Comparative positive electrode 101 | Comparative Mixture Slurry 101 for positive electrode | Comparative Dispersion Composition 101 | 97.2 | MIRALON manufactured by NANOCOMP |
| Comparative Example 3-102 | Comparative positive electrode 102 | Comparative Mixture Slurry 102 for positive electrode | Comparative Dispersion Composition 102 | 97.2 | MIRALON manufactured by NANOCOMP |

| | CNT non-volatile component Mass % | Dispersant non-volatile component Mass % | CMC non-volatile component Mass % | PVdF non-volatile component Mass % | PTFE non-volatile component Mass % | Composite material non-volatile component Mass % |
|---|---|---|---|---|---|---|
| Example 3-1 | 0.15 | 0.14 | 1.0 | — | 1.5 | 65 |
| Example 3-2 | 0.15 | 0.14 | 1.0 | — | 1.5 | 65 |
| Example 3-3 | 0.15 | 0.14 | 1.0 | — | 1.5 | 65 |
| Example 3-4 | 0.15 | 0.14 | 1.0 | — | 1.5 | 65 |
| Example 3-5 | 0.15 | 0.14 | 1.0 | — | 1.5 | 65 |
| Example 3-6 | 0.15 | 0.14 | 1.0 | — | 1.5 | 65 |
| Example 3-7 | 0.15 | 0.14 | 1.0 | — | 1.5 | 65 |
| Comparative Example 3-1 | 0.50 | 0.20 | 1.0 | — | 1.5 | 65 |
| Comparative Example 3-2 | 0.30 | 0.27 | 1.0 | — | 1.5 | 65 |
| Example 3-101 | 0.15 | 0.14 | — | 2.5 | — | 65 |
| Example 3-102 | 0.15 | 0.14 | — | 2.5 | — | 65 |
| Example 3-103 | 0.15 | 0.14 | — | 2.5 | — | 65 |
| Example 3-104 | 0.15 | 0.14 | — | 2.5 | — | 65 |
| Comparative Example 3-101 | 0.15 | 0.14 | — | 2.5 | — | 65 |
| Comparative Example 3-102 | 0.15 | 0.14 | — | 2.5 | — | 65 |

TABLE 4

| | Battery for evaluation | Negative electrode | Positive electrode | Rate properties | Cycle properties |
|---|---|---|---|---|---|
| Example 4-1 | Battery 1 for evaluation on negative electrode | Negative Electrode 1 | Standard positive electrode | ⊚ | ⊚ |
| Example 4-2 | Battery 2 for evaluation on negative electrode | Negative Electrode 2 | Standard positive electrode | ○ | ○ |
| Example 4-3 | Battery 3 for evaluation on negative electrode | Negative Electrode 3 | Standard positive electrode | ⊚ | ○ |
| Example 4-4 | Battery 4 for evaluation on negative electrode | Negative Electrode 4 | Standard positive electrode | ○ | ⊚ |
| Example 4-5 | Battery 5 for evaluation on negative electrode | Negative Electrode 5 | Standard positive electrode | ⊚ | ⊚⊚ |
| Example 4-6 | Battery 6 for evaluation on negative electrode | Negative Electrode 6 | Standard positive electrode | ⊚ | ⊚ |

TABLE 4-continued

|  | Battery for evaluation | Negative electrode | Positive electrode | Rate properties | Cycle properties |
|---|---|---|---|---|---|
| Example 4-7 | Battery 7 for evaluation on negative electrode | Negative Electrode 7 | Standard positive electrode | ◎ | ◎ |
| Example 4-8 | Battery 8 for evaluation on negative electrode | Negative Electrode 8 | Standard positive electrode | ◎ | ○ |
| Example 4-9 | Battery 9 for evaluation on negative electrode | Negative Electrode 9 | Standard positive electrode | ◎ | ○ |
| Example 4-10 | Battery 10 for evaluation on negative electrode | Negative Electrode 10 | Standard positive electrode | ◎ | ◎ |
| Example 4-11 | Battery 11 for evaluation on negative electrode | Negative Electrode 11 | Standard positive electrode | ○ | ○ |
| Example 4-12 | Battery 12 for evaluation on negative electrode | Negative Electrode 12 | Standard positive electrode | ◎ | ○ |
| Comparative Example 4-1 | Battery 1 for evaluation on comparative negative electrode | Comparative Negative Electrode 1 | Standard positive electrode | ○ | Δ |
| Comparative Example 4-2 | Battery 2 for evaluation on comparative negative electrode | Comparative Negative Electrode 2 | Standard positive electrode | Δ | Δ |
| Comparative Example 4-3 | Battery 3 for evaluation on comparative negative electrode | Comparative Negative Electrode 3 | Standard positive electrode | Δ | Δ |
| Comparative Example 4-4 | Battery 4 for evaluation on comparative negative electrode | Comparative Negative Electrode 4 | Standard positive electrode | ○ | Δ |

TABLE 5

|  | Battery for evaluation | Negative electrode | Positive electrode | Rate properties | Cycle properties |
|---|---|---|---|---|---|
| Example 5-1 | Battery 1 for positive electrode evaluation | Standard negative electrode | Positive Electrode 1 | ◎ | ◎ |
| Example 5-2 | Battery 2 for positive electrode evaluation | Standard negative electrode | Positive Electrode 2 | ○ | ○ |
| Example 5-3 | Battery 3 for positive electrode evaluation | Standard negative electrode | Positive Electrode 3 | ○ | ○ |
| Example 5-4 | Battery 4 for positive electrode evaluation | Standard negative electrode | Positive Electrode 4 | ○ | ◎ |
| Example 5-5 | Battery 5 for positive electrode evaluation | Standard negative electrode | Positive Electrode 5 | ◎ | ◎◎ |
| Example 5-6 | Battery 6 for positive electrode evaluation | Standard negative electrode | Positive Electrode 6 | ◎ | ○ |
| Example 5-7 | Battery 7 for positive electrode evaluation | Standard negative electrode | Positive Electrode 7 | ◎ | ◎ |
| Example 5-101 | Battery 101 for positive electrode evaluation | Standard negative electrode | Positive Electrode 101 | ◎ | ◎ |
| Example 5-102 | Battery 102 for positive electrode evaluation | Standard negative electrode | Positive Electrode 102 | ○ | ○ |
| Example 5-103 | Battery 103 for positive electrode evaluation | Standard negative electrode | Positive Electrode 103 | ○ | ○ |
| Example 5-104 | Battery 104 for positive electrode evaluation | Standard negative electrode | Positive Electrode 104 | ◎ | ○ |

TABLE 5-continued

|  | Battery for evaluation | Negative electrode | Positive electrode | Rate properties | Cycle properties |
|---|---|---|---|---|---|
| Comparative Example 5-1 | Comparative Battery 1 for positive electrode evaluation | Standard negative electrode | Comparative Positive electrode 1 | ○ | Δ |
| Comparative Example 5-2 | Comparative Battery 2 for positive electrode evaluation | Standard negative electrode | Comparative Positive electrode 2 | Δ | Δ |
| Comparative Example 5-101 | Comparative Battery 101 for positive electrode evaluation | Standard negative electrode | Comparative Positive electrode 101 | Δ | Δ |
| Comparative Example 5-102 | Comparative Battery 102 for positive electrode evaluation | Standard negative electrode | Comparative Positive electrode 102 | ○ | Δ |

As shown in the table, the examples in which the physical property values of CNTs observed in the CNT dispersion composition exhibited a predetermined range can provide secondary batteries that demonstrate good rate properties and cycle properties.

For example, in Comparative Example 4-1, due to the low linearity index of CNTs in the CNT dispersion composition, it is expected that the number of particles of the active substance in contact with a single CNT in the secondary battery is small. In such cases, when charge and discharge are repeated in the secondary battery, the proportion of the particles of active substance interconnected by CNTs decreases due to volume changes in the active substance, resulting in decreased cycle properties. In Comparative Example 4-2, furthermore, due to the large average outer diameter of CNTs in the CNT dispersion composition, it is considered that the conductivity of CNTs in the secondary battery decreases, and the rate properties decrease. Similar trends were observed in Comparative Examples 5-1 and 5-2, as well as in other comparative examples.

What is claimed is:

1. A carbon nanotube dispersion composition, comprising:
   carbon nanotubes; a dispersant; and a solvent, wherein the carbon nanotube dispersion composition satisfies (1) and (2) as follows:
   (1) an average outer diameter of the carbon nanotubes calculated from an SEM image obtained by observing the carbon nanotubes included in the carbon nanotube dispersion composition is 15 nm to 50 nm; and
   (2) when a target pixel group in the SEM image, corresponding to an individual carbon nanotube comprised in the carbon nanotube dispersion composition, is taken as the carbon nanotube, and within the target pixel group a value obtained from a distance between two points that are farthest apart divided by a skeleton length is taken as linearity of the carbon nanotube, 40% to 90% of the carbon nanotubes having skeleton lengths of 1 μm or greater have linearity of 0.9 or higher.

2. The carbon nanotube dispersion composition as claimed in claim 1, wherein: (3) in a Raman spectrum of a coating film of the carbon nanotube dispersion composition, when a maximum peak intensity within a range of 1560 $cm^{-1}$ to 1600 $cm^{-1}$ is taken as G and a maximum peak intensity within a range of 1310 $cm^{-1}$ to 1350 $cm^{-1}$ is taken as D, a G/D ratio is 1.0 to 20.0.

3. The carbon nanotube dispersion composition as claimed in claim 1, wherein: (4) after the carbon nanotube dispersion composition is frozen and dried, a BET specific surface area of a powder that passes through a 60-μm mesh with respect to a mass of carbon nanotubes is 50 $m^2/g$ to 130 $m^2/g$.

4. The carbon nanotube dispersion composition as claimed in claim 1, wherein: (5) a complex modulus is 4Pa to 200 Pa at 25° C. and a frequency of 10 Hz according to dynamic viscoelasticity measurement.

5. The carbon nanotube dispersion composition as claimed in claim 1, wherein: (6) a phase angle at 25° C. and a frequency of 10 Hz according to dynamic viscoelasticity measurement is 3° to 60°.

6. A carbon nanotube resin composition, comprising: the carbon nanotube dispersion composition as claimed in claim 1; and a binder.

7. A mixture slurry, comprising: the carbon nanotube dispersion composition as claimed in claim 1; a binder; and an active substance.

8. An electrode film as a coating film of a mixture slurry, the mixture slurry comprising: the carbon nanotube dispersion composition as claimed in claim 1, a binder, and an active substance.

9. A non-aqueous electrolyte secondary battery comprising a positive electrode, a negative electrode, and an electrolyte, wherein at least one of the positive electrode and the negative electrode comprises the electrode film as claimed in claim 8.

* * * * *